US012608727B2

(12) United States Patent
Huang et al.

(10) Patent No.: US 12,608,727 B2
(45) Date of Patent: Apr. 21, 2026

(54) SYSTEM, METHOD, AND APPARATUS FOR DATA COLLECTION AND AGGREGATION

(71) Applicant: MARS, INCORPORATED, McLean, VA (US)

(72) Inventors: Lung Huang, New York, NY (US); Leonid Sudakov, New York, NY (US); Matthew Keylock, London (GB)

(73) Assignee: MARS, INCORPORATED, McLean, VA (US)

( * ) Notice: Subject to any disclaimer, the term of this patent is extended or adjusted under 35 U.S.C. 154(b) by 0 days.

(21) Appl. No.: 18/001,444

(22) PCT Filed: Jun. 14, 2021

(86) PCT No.: PCT/US2021/037241
§ 371 (c)(1),
(2) Date: Dec. 9, 2022

(87) PCT Pub. No.: WO2021/253004
PCT Pub. Date: Dec. 16, 2021

(65) Prior Publication Data
US 2023/0222550 A1      Jul. 13, 2023

Related U.S. Application Data

(60) Provisional application No. 63/038,568, filed on Jun. 12, 2020.

(51) Int. Cl.
*G06Q 30/0251* (2023.01)
*G06Q 30/0601* (2023.01)

(52) U.S. Cl.
CPC ..... *G06Q 30/0269* (2013.01); *G06Q 30/0631* (2013.01)

(58) Field of Classification Search
CPC .... G16H 20/00; G16H 10/60; G06Q 30/0269; G06Q 30/0631
(Continued)

(56) References Cited

U.S. PATENT DOCUMENTS

| | | |
|---|---|---|
| 2003/0065636 A1 | 4/2003 | Peyrelevade |
| 2003/0088439 A1* | 5/2003 | Grushka ................ G16H 70/60 |
| | | 600/300 |

(Continued)

FOREIGN PATENT DOCUMENTS

| | | |
|---|---|---|
| EP | 0 575 021 A2 | 12/1993 |
| GB | 2574912 A | 12/2019 |

(Continued)

OTHER PUBLICATIONS

ScienceDirect, Animal Health Monitoring System, 2019 (Year: 2019).*

(Continued)

*Primary Examiner* — Tarek Elchanti
(74) *Attorney, Agent, or Firm* — Baker Botts L.L.P.

(57) ABSTRACT

The present disclosure relates to a system, apparatus, or method for meeting a healthcare need of a pet. Certain non-limiting embodiments include collecting data from one or more disparate data sources, and aggregating the collected data from the one or more disparate sources in a data lake. Certain non-limiting embodiments also include clearing personal identification information from the aggregated data in the data lake, and sorting the cleared data into one or more datasets based on one or more attributes of the pet or an owner of the pet. In addition, the certain non-limiting embodiments can include creating a profile of a pet based on the data included in the one or more datasets, and determining a pet product to help fulfill the healthcare need of the pet. Further, certain non-limiting embodiments can include tar- (Continued)

geting the owner of the pet with an advertisement of the pet product.

26 Claims, 11 Drawing Sheets

(58) Field of Classification Search
USPC ...................................................... 705/14.49
See application file for complete search history.

(56) References Cited

U.S. PATENT DOCUMENTS

| | | | |
|---|---|---|---|
| 2004/0099224 A1 | 5/2004 | Russell-Maynard et al. | |
| 2013/0124329 A1 | 5/2013 | Tengler | |
| 2014/0316805 A1 | 10/2014 | Nagata | |
| 2016/0012748 A1 | 1/2016 | Donavon | |
| 2016/0286755 A1* | 10/2016 | Feng .................... A01K 5/0283 | |
| 2018/0218407 A1 | 8/2018 | He et al. | |
| 2019/0304578 A1 | 10/2019 | Kain et al. | |

FOREIGN PATENT DOCUMENTS

| | | | | |
|---|---|---|---|---|
| JP | 2012168603 A | 9/2012 | | |
| JP | 2019-537794 A | 12/2019 | | |
| KR | 102183603 B1 * | 11/2020 | ............. G06Q 50/22 | |
| RU | 2007111716 A * | 10/2008 | ............. A23K 40/00 | |
| WO | 2008/140736 A1 | 11/2008 | | |
| WO | WO-2014050118 A1 * | 4/2014 | ............. G06Q 10/10 | |
| WO | 2016/099571 A1 | 6/2016 | | |
| WO | 2016/191389 A2 | 12/2016 | | |
| WO | 2019143714 A1 | 7/2019 | | |
| WO | 2019223379 A1 | 11/2019 | | |
| WO | WO-2022150486 A1 * | 7/2022 | ......... G06F 21/6218 | |

OTHER PUBLICATIONS

Steven J. Schapiro, Management of Animal Care and Use Programs in Research, Education, and Testing. 2nd edition, 2018 (Year: 2018).*

International Search Report mailed Oct. 11, 2021 for International Application No. PCT/US2021/037241.

Shofiqur et al., "Effect of passive immunization by anti-gingipain IgY on periodontal health of dogs," Veterinary Science Development, 1(1):e8, pp. 35-39 (2011).

De Godoy et al., "Alternative Dietary Fiber Sources in Companion Animal Nutrition", Nutrients, 5(8):3099-3117 (2013).

Shofiqur et al., "Oral passive IgY-based immunotherapeutics : A novel solution for prevention and treatment of alimentary tract diseases," Human Vaccines & Immunotherapeutics, 9(5):1039-1048 (2013).

Extended European Search Report dated Mar. 26, 2024 in Application No. EP 21754638.

Archive of glossary and terms for Gradient Boosting. Dated Aug. 16, 2019. URL: https://web.archive.org/web/20190816101206/htts:// deepai.org/machine-learning-glossary-and-terms/gradient-boosting.

Privacy Risks with Facebook's Pll-based Targeting: Auditing a Data Broker's Advertising Interface, Giridhari Venkatadri et al., IEEE Symposium on Security and Privacy 2018: 89-107.

Brookman et al., "Cross-Device Tracking: Measurement and Disclosures," Proceedings on Privacy Enhancing Technologies; (2):133-148 (2017).

English machine translation of WO 2019/223379 (D6a).

Venkatadri et al., "Privacy Risks with Facebook's Pll-based Targeting: Auditing a Data Broker's Advertising Interface," IEEE Symposium on Security and Privacy 2018: 89-107.

* cited by examiner

9000

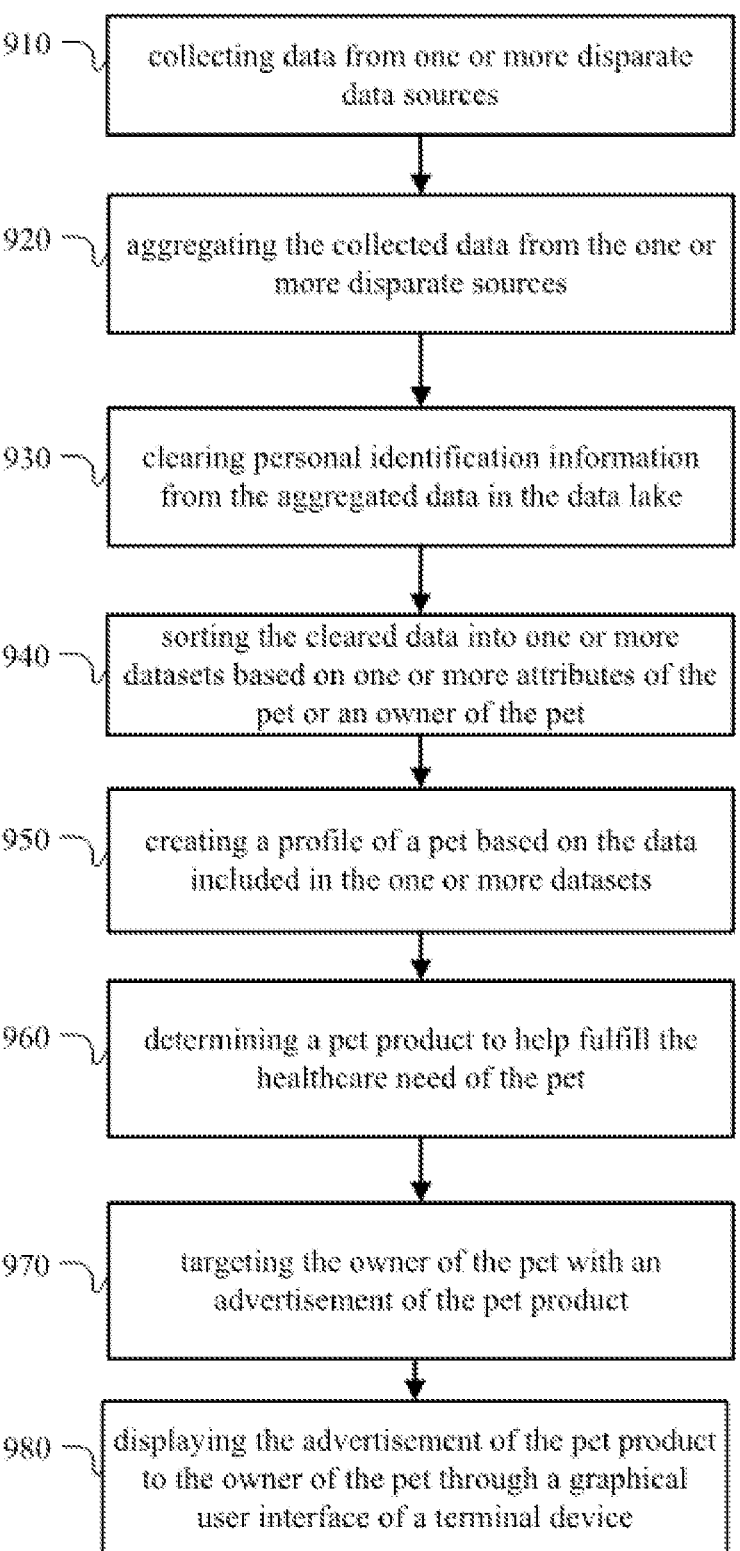

910 — collecting data from one or more disparate data sources

920 — aggregating the collected data from the one or more disparate sources

930 — clearing personal identification information from the aggregated data in the data lake 940 — sorting the cleared data into one or more datasets based on one or more attributes of the pet or an owner of the pet 950 — creating a profile of a pet based on the data included in the one or more datasets 960 — determining a pet product to help fulfill the healthcare need of the pet 970 — targeting the owner of the pet with an advertisement of the pet product 980 — displaying the advertisement of the pet product to the owner of the pet through a graphical user interface of a terminal device

SYSTEM, METHOD, AND APPARATUS FOR DATA COLLECTION AND AGGREGATION

CROSS-REFERENCE TO RELATED APPLICATIONS

This application is a U.S. National Stage Patent Application under 35 U.S.C. § 371 of International Patent Application No. PCT/US2021/037241 filed Jun. 14, 2021, which claims priority to U.S. Provisional Application No. 63/038, 568, filed Jun. 12, 2020 the contents of each of which are hereby incorporated by reference in their entireties, and to each of which priority is claimed.

This application claims priority to U.S. Provisional Application No. 63/038,568, filed Jun. 12, 2020 the contents of which are hereby incorporated by reference in its entirety.

FIELD OF THE INVENTION

The present disclosure relates to aggregation and linking of data from one or more sources, more particularly to the linking of data related to pet care from one or more sources.

BACKGROUND

The digital data footprint created by pet owners in today's world is ever growing. Like any other consumer group, pet owners make various online and in-store purchases for pet products. These pet products are wide ranging, and can include anything from food to toys to clothing items. Beyond traditional consumer products, however, pet owners are distinctly positioned to create digital data related to their pets. For example, some owners place health or location tracking devices on their pets. In addition, some owners employ services for DNA or genetic testing of pets. These devices and services, as well as other available services used by pets, can offer unique insight about a given pet, far beyond what can be deemed from traditional consumer data. Given the sheer volume of data being collected, it has become increasingly difficult to hone this data to the benefit of the pet and the pet's owner.

Accordingly, there is an ongoing demand in the pet care industry for an apparatus, system, and method to analyze data related to pet care. In particular, there remains a need for aggregating and linking a diverse set of digital data related to pet care. Doing so can help owners better understand the needs or preferences of their pets, leading pet owners to better care for their pets' health and wellness.

SUMMARY

The present disclosure relates to a system, apparatus, or method for aggregating and linking a diverse set of data related to pet care, resulting in an improved understanding of the needs and wishes of a given pet. Certain non-limiting embodiments can include a method for meeting a healthcare need of a pet. Certain non-limiting embodiments of the method can include collecting data from one or more disparate data sources, and aggregating the collected data from the one or more disparate sources in a data lake. The method can also include clearing personal identification information from the aggregated data in the data lake, and sorting the cleared data into one or more datasets based on one or more attributes of the pet or an owner of the pet. In addition, the method can include creating a profile of a pet based on the data included in the one or more datasets, and determining a pet product to help fulfill the healthcare need of the pet. Further, the method can include targeting the owner of the pet with an advertisement of the pet product.

In certain non-limiting embodiments, the method can further include displaying the advertisement of the pet product to the owner of the pet through a graphical user interface of a terminal device. The method can also include reformatting the data from one or more disparate data sources to a uniform level of quality. In addition, the method can include predicting a target audience for the advertisement of the pet product, wherein the target audience can include the pet owner and one or more other pet owners. In some non-limiting embodiments, the data can include at least one of first-party data, second-party data, or third-party data. The one or more disparate data sources can include a health and location tracking device, a DNA or genetic testing service, or a point of sale device at a veterinary hospital. The collected data can include pet health information. In other non-limiting embodiments, the aggregating, clearing, sorting, creating, and determining can be performed by a consumer data platform or a data management platform. The determining or the predicting can use a machine learning algorithm for the predicting of the target audience or the determining of the pet product to help fulfill the healthcare need of the pet. The one or more datasets can include at least one of pet health, pet ownership, physical or behavior traits of the pet.

In certain non-limiting embodiments, a system for meeting a healthcare need of a pet can include at least one memory comprising computer program code, and at least one processor. The computer program code can be configured, when executed by the at least one processor, to cause the apparatus to collect data from one or more disparate data sources, and aggregate the collected data from the one or more disparate sources in a data lake. The computer program code can also be configured, when executed by the at least one processor, to cause the apparatus to clear personal identification information from the aggregated data in the data lake, and sort the cleared data into one or more datasets based on one or more attributes of the pet or an owner of the pet. In addition, the computer program code can also be configured, when executed by the at least one processor, to cause the apparatus to create a profile of a pet based on the data included in the one or more datasets, and determine a pet product to help fulfill the healthcare need of the pet. Further, the computer program code can also be configured, when executed by the at least one processor, to cause the apparatus to target the owner of the pet with an advertisement of the pet product.

According to certain embodiments a non-transitory computer-readable medium encoding instructions that, when executed in hardware perform a process for meeting a healthcare need of a pet. The process can include collecting data from one or more disparate data sources, and aggregating the collected data from the one or more disparate sources in a data lake. The process can also include clearing personal identification information from the aggregated data in the data lake, and sorting the cleared data into one or more datasets based on one or more attributes of the pet or an owner of the pet. In addition, the process can include creating a profile of a pet based on the data included in the one or more datasets, and determining a pet product to help fulfill the healthcare need of the pet. Further, the process can include targeting the owner of the pet with an advertisement of the pet product.

An apparatus, in certain embodiments, can include a computer program product encoding instructions for processing data of a tested pet product according to a method for meeting a healthcare need of a pet. Certain non-limiting embodiments of the method can include collecting data from one or more disparate data sources, and aggregating the collected data from the one or more disparate sources in a data lake. The method can also include clearing personal identification information from the aggregated data in the data lake, and sorting the cleared data into one or more datasets based on one or more attributes of the pet or an owner of the pet. In addition, the method can include creating a profile of a pet based on the data included in the one or more datasets, and determining a pet product to help fulfill the healthcare need of the pet. In some embodiments, the method can include determining a pet product to help fulfill any pet service or pet product needs of the pet. Further, the method can include targeting the owner of the pet with an advertisement of the pet product.

It is to be understood that both the foregoing general description and the following detailed description are exemplary and are intended to provide further explanation of the disclosed subject matter claimed.

BRIEF DESCRIPTION OF THE DRAWINGS

FIG. 9 illustrates a flow diagram according to certain non-limiting embodiments;

DETAILED DESCRIPTION

Figure 1:
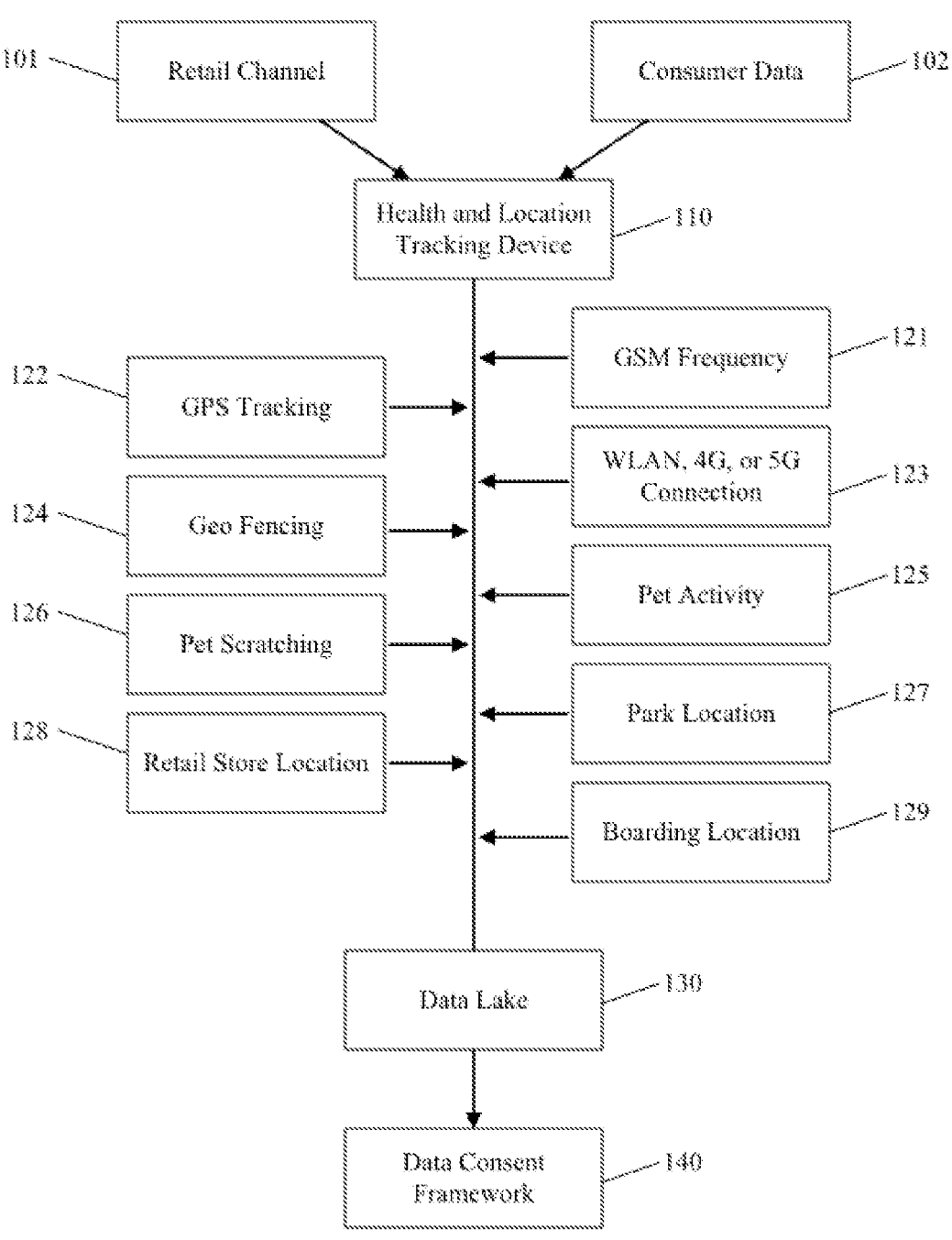
FIG. 1 illustrates a system or apparatus for data collection or aggregation according to certain non-limiting embodiments.

There remains a need for aggregating and linking a diverse or disparate set of data related to pet care, resulting in an improved understanding of the needs and wishes of a given pet. Specifically, there remains a need for techniques that allow for the aggregation and linking of a diverse set of digital data in order to predict or determine pet products related to the healthcare needs of a pet. The presently disclosed subject matter addresses these and other needs.

For clarity and not by way of limitation, this detailed description is divided into the following sub-portions:

A. Definitions;

B. Collecting or aggregating data;

C. Linking data and predicting audiences or products;

D. Results of system or method described herein;

E. Flow diagram of method described herein; and

F. Diagrams of system and apparatus described herein.

A. Definitions

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

As used in the specification and the appended claims, the singular forms "a," "an" and "the" include plural referents unless the context clearly dictates otherwise. Thus, for example, reference to "a compound" includes mixtures of compounds.

The terms "animal" or "pet" as used in accordance with the present disclosure refers to domestic animals including, but not limited to, domestic dogs, domestic cats, horses, cows, ferrets, rabbits, pigs, rats, mice, gerbils, hamsters, goats, and the like. Domestic dogs and cats are particular non-limiting examples of pets. The term "animal" or "pet" as used in accordance with the present disclosure can further refer to wild animals, including, but not limited to bison, elk, deer, venison, duck, fowl, fish, and the like.

As used herein, the terms "comprises," "comprising," or any other variation thereof, are intended to cover a non-exclusive inclusion, such that a process, method, article, system, or apparatus that comprises a list of elements does not include only those elements but can include other elements not expressly listed or inherent to such process, method, article, or apparatus.

In the detailed description herein, references to "embodiment," "an embodiment," "one embodiment," "in various embodiments," "certain embodiments," "some embodiments," "other embodiments," "certain other embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In general, terminology can be understood at least in part from usage in context. For example, terms, such as "and", "or", or "and/or," as used herein can include a variety of meanings that can depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

The term "data" includes for example without limitation, any type of digital or non-digital data related to a pet or a pet product. In certain embodiments, the data can be any measurement related to the health, breed, physical attribute, disease, diagnosis, location, activity, nutritional intake, prescriptions, wellness plan, genetics, and/or deoxyribonucleic acid (DNA) of the pet, or any other information related to the pet. In some other embodiments the data can include any information related to the habits, purchases, or activity of the pet owner, whether related or not related to the pet itself. The data can also include searches, browsing, or purchasing habits on one or more internet web sites.

The term "first-party data" can include data directly collected and/or owned by a company. First-party data, for example, can be collected from consumers using products or services offered by a given company.

The term "third-party data" can include data collected by other companies. Third-party data can be accessed or purchased using a data-management platform. For example, a company can purchase third-party data to expand its target audiences.

The term "pet product" includes for example without limitation, any type of product, service, or equipment that is designed, manufactured, or used by a pet. For example, the pet product can be a toy, chewable, food, clothing, collar, medication, and/or a health or location tracking device. In another example a pet product can include a genetic or DNA testing service for pets.

The term "pet owner" can include any person, organization, or collection of persons responsible for the care of a pet.

The term "digital-side platform" can be a system or software that facilitates the purchasing of digital advertising. In other words, "digital-side-platform" allows advertisers to buy digital advertising, also known as impressions, across a range of websites. The advertising can be targeted specific users based on data or information related to the users. For example, the advertising can specifically target a pet owner based on data related to the pet. In certain embodiments, the digital-side platform can help manage an inventory of available advertising space provided by publishers.

The term "real-time bidding" can be a programmed auction that allows purchasers to buy available advertising space. In certain embodiments real-time bidding between one or more purchasers can be managed using a digital-side platform.

The term "data management platform" can be a system or software used to collect, organize, management, and/or activate large sets of data from disparate sources. The data management platform, for example, can include one or more of collecting, unifying, organizing, activating, and/or analyzing data. For example, data management platforms can use one or more artificial intelligence or machine learning algorithms for processing and analyzing datasets. In some embodiments data management platforms collect anonymous web and/or digital data. The records of the data management platform can be updated discretely using a batch process.

The term "customer data platform" can be a system or software used to collect data and create a unified customer database accessible to other systems. In certain embodiments a customer data platform can collect first-party data from one or more sources, clean and/or reformat the data, and aggregate or combine the data to form a single customer or pet profile. Customer data platforms can therefore collect data that is tied to an identifiable person, consumer, or pet. In some embodiments the customer data platform can continuously or discretely collect data to keep profiles up to date and accurate.

The term "data lake" can be a database, a data library, a data repository, or any other storage medium. In certain embodiments, the data lake can be centralized or de-centralized. The data maintained within the data lake can be structured, unstructured, or semi-structured. For example, the data lake can include raw first-party data, which can be considered unstructured.

The term "personal data" can be any information that can be used to infer or determine the identity of a person or pet. In certain embodiments personal data can be referred to as "personal identification information" or "personally identifiable information." For example, a name, government identification number, date and place of birth, mother's maiden name, and/or biometric records can be considered personal data. Other personal information can be an internet protocol address, geolocation, and/or a patient identification given by a healthcare facility. Any other information that can be linked to a person or pet, such as medical, educational, financial, and/or employment information, can also be considered personal data.

The term "geo-fence zone," "geo-fence location," or "geo-fencing" can be a pre-determined, pre-selected, or known geographical area or location selected by the user. The geo-fence zone or location can be used to define a familiar geographical area or location to the pet or animal, such as the residence of the owner or care giver of the pet. In some examples the geo-fence zone or location can be determined using a global positioning system (GPS) or global navigation satellite system (GLONASS) receiver to determine the latitude and longitude of a device. In other examples, the geo-fence zone, location, or presence can be determined using pre-determined, preselected, or known service set identifier (SSID) of a wireless land area network (WLAN) network. When the geo-fence zone or location is determined using an SSID scan, or any other characteristic or measurement associated with the WLAN, the geo-fence zone or location can be referred to as a "beacon zone." In other words, in certain non-limiting embodiments a client station can be determined to be in a given zone or location when it is within the transmission range of a given access point. To determine whether the client station is located within or outside a geo-fence location or zone, the client station can transmit probe requests and received probe responses from an access point (AP) of the WLAN network.

The term "terminal device" refers to, for example without limitation, a personal computer, laptop computer, workstation, television, mobile device, terminal device, or any other user equipment. In some non-limiting examples, the terminal device can include a graphical user interface used to display an advertisement related to a pet product. In certain embodiments a web-based application can be installed on the user's terminal device. In other non-limiting embodiments, the terminal device can be a pet tracking device with a microelectromechanical system (MEMS) device or accelerometer.

B. Collecting or Aggregating Data

In certain non-limiting embodiments, data can be collected from one or more sources. The collected data can then be aggregated and linked to create a user, customer, or pet profile. The data can include first-party data, second-party data, and/or or third-party data. For example, the first-party data can be collected from a health and location tracking device, a DNA or genetic testing service, and/or a point of sale (POS) device at a veterinary hospital.

FIG. 1 illustrates a system or apparatus for data collection or aggregation according to certain non-limiting embodiments. In particular, FIG. 1 illustrates a pet health and/or location tracking device 110, which can be a source from which data can be collected. Pet health and/or location tracking device 110 can be a computing device used to monitor and/or track pet activity. In some non-limiting embodiments pet health and/or location tracking device 110 can be configured to collect data generated by various hardware or software components. Examples of hardware or software components can include a global positioning system (GPS) receiver and/or one or more sensors or transducers, such as an accelerometer, a gyroscope, or any other device or component used to record, collect, or receive data regarding the movement or activity of the pet wearing, or otherwise carrying, tracking device 110. Pet health and/or location tracking device 110 can includes one or more processors, memory, transducer, and/or any other hardware components used receive, collect, process, store, and/or transmit data.

Examples of pet health and/or location tracking device 110 are described in U.S. patent application Ser. No. 16/570,771, U.S. patent application Ser. No. 16/182,057, now U.S. Pat. No. 10,708,709, U.S. patent application Ser. No. 15/291,882, now U.S. Pat. No. 10,142,773, U.S. patent application Ser. No. 15/287,544, U.S. patent application Ser. No. 14/231,615, now U.S. Pat. No. 10,420,401, U.S. Provisional Application Nos. 62/970,575, 62/867,226, and 62/768,414, U.S. Design application No. 29/696,311, U.S. Design application No. 29/696,315 and International Patent Application Nos. PCT/US17/55220 and PCT/US17/55224. The above referenced applications and patents are hereby incorporated by reference in their entirety.

In certain non-limiting embodiments health and location tracking device 110 can initially collect information from retail channel 101 and/or consumer data 102. Information from retail channel 101 can be any information or data related to the merchant or retailer from which health and location tracking device 110 was purchased. Retail channel 101, for example, can include one or more of a mass merchandiser, club store, drug store, health store or pharmacy, pet specialty stores, e-commerce, or pet related stores. Health and location tracking device 110 can be purchased online, through a retailer or merchant, or through any other means. Consumer data 102 can be any information, personal or otherwise, related to either the pet owner purchasing tracking device 110 or the pet wearing tracking device 110. Consumer data 102 can be ascertained from the pet owner during initial activation or setup of tracking device 110.

Consumer data 102, for example, can include household income, home ownership, spending habits, geo-location, lifestyle attributes, weather patterns or information, environmental data, and household purchase habits. Other consumer data 102 can include demographic, lifestyle, vehicle data, census, credit worthiness, socioeconomic data, consumer attitudes, behaviors, preferences, purchases, lifestyle, health, wellness, finances, and/or wealth. In certain non-limiting embodiments, consumer data 102 can include loyalty card data, which many retail stores use to identify a person regardless of tender. Loyalty card data can include details related to purchased items. In some non-limiting embodiments consumer data 102 can include transactional total from payment card issuers, and/or panel data of consumer panels who scan all purchases at retail locations.

Panel data can be used to project sales. In other non-limiting embodiments, consumer data 102 can include exposure data, print circulation data from newspapers and magazines, mobile phone and radio data, and/or nielsen media data. Exposure data can include publisher data, such as page views, stores, length of time viewing a given webpage or website. Nielsen media data can include panel data of television viewers. In some other non-limiting embodiments, consumer data 102 can include buy data, including any data related to consumer purchases. For example, buy data can include frequent shopper card data, such as UPC scans or card identifications, for which promotions and messages can be triggered based on the shopper's purchase insights. The promotions and/or messages can be delivered at the point of sale, for example, via a full-color, high-speed printer.

Health and location tracking device 110 can collect geographical location or network connection information. The network connection information can be used to determine the location of health and/or location tracking device 110, as well as other network metrics that can provide information related to the pet or the pet owner. In certain non-limiting embodiments, health and location tracking device 110 can collect information such as, global system for mobile communications (GSM) frequency 121, GPS tracking 122, WLAN, fourth generation (4G), or fifth generation (5G) connection 123, geo-fencing 124, park location 127, retail store location 128, and or boarding location 129. GSM is a standard developed by the European Telecommunications Standards Institute (ETSI) to define the protocols for second generation (2G) digital cellular networks. Retail store location 128 can include a location and/or identity of the retail store visited by a pet or pet owner. Boarding location 129 can include a location and/or identity of a pet boarding facility. Park location 127 can include an outdoor or indoor park visited by a pet wearing health and location tracking device 110.

Other information collected by health and location tracking device 110 can include pet activity 125. Pet activity 125 can include any body movement capable of being detected by health and location tracking device 110. For example, pet activity 125 can include itching, scratching, licking, walking, drinking, eating, sleeping, and shaking, and/or any other bodily movement associated with an action performed by the pet. Health and location tracking device 110 can also be used to identify a pet activity 125, such as a pet jumping around, moving around in an excited manner for food, eating voraciously, and/or drinking out of the bowl on the wall. Pet activity 125, also referred to as pet behavior, can be specific to the pet species. For example, there can be behaviors attributable to cats and other behaviors attributable to dogs. While one or more behaviors can overlap, some behaviors can be unique to cats or dogs. The one or more behaviors, in certain embodiments, can be a symptom, or indicative of a symptom, associated with a health condition or disease. In some non-limiting embodiments pet scratching 126 can be collected separately from other pet activity.

The raw data collected from health and location tracking device 110 can be forwarded to data lake 130. The data can then be forwarded to data consent framework 140. Data consent framework 140 can help to ensure that the handling of the data complies with regulatory guidelines. After the data is collected and cleaned, the fidelity and veracity of the data can be ensured. For example, data consent framework 140 can be a framework created by Internet Advertising Bureau (IAB) that uses a transparency and consent string (TC string). TC string can be used to encapsulate relevant details about how transparency and consent can be established and encoded as applied to purposes, special purposes, features, and special features. In particular, TC string can encapsulate and encode all the information disclosed to a user and/or the expression of their preferences for their personal data processing under the General Data Protection Regulation (GDPR) or other international, national, state, or local regulations. Using a Consent Management Platform (CMP), the information can be captured into an encoded and compact HTTP-transferable string. This string can allow communication of transparency and consent information to one or more entities or vendors that process a user's personal data, including, for example, the California Consumer Privacy Act. The entities or vendors can then decode a TC String to determine whether they can process a user's personal data for their purposes based on existing international, national, state, or local regulations. The concise string data format can allow a CMP to persist and retrieve user preferences, as well as transfer that information to one or more entities or vendors.

In certain non-limiting embodiments, the TC string can include one or more of general metadata, user consent, legitimate interest, published restrictions, published transparency and consent, out-of-band legal bases, and/or specific jurisdiction disclosures. General metadata can include markers indicating details about a TC string, such as encoding version, last update, when it was initially created, details about the conditions of the transparency and consent values, for example global vendor list, and/or the CMP used. Use consent can be the user's expression of consent given for processing their personal data, whether per purpose or per vendor. Legitimate interest, for example, can be the record of a CMP having established legitimate interest transparency for a vendor or purpose, and/or whether the user exercised their right to object. Publisher transparency and consent can be a segment of a TC string that publishers can use to establish transparency with or receive consent from users for their own legal bases to process personal data and/or to share personal data with vendors. Out-of-band legal basis can be at least two segments used to express that a vendor is using legal bases outside of the framework to process personal data. For example, the first segment can be a list of vendors disclosed to the user, while the second can be a list of vendors that the published can allow to use out-of-band legal bases.

Figure 5:
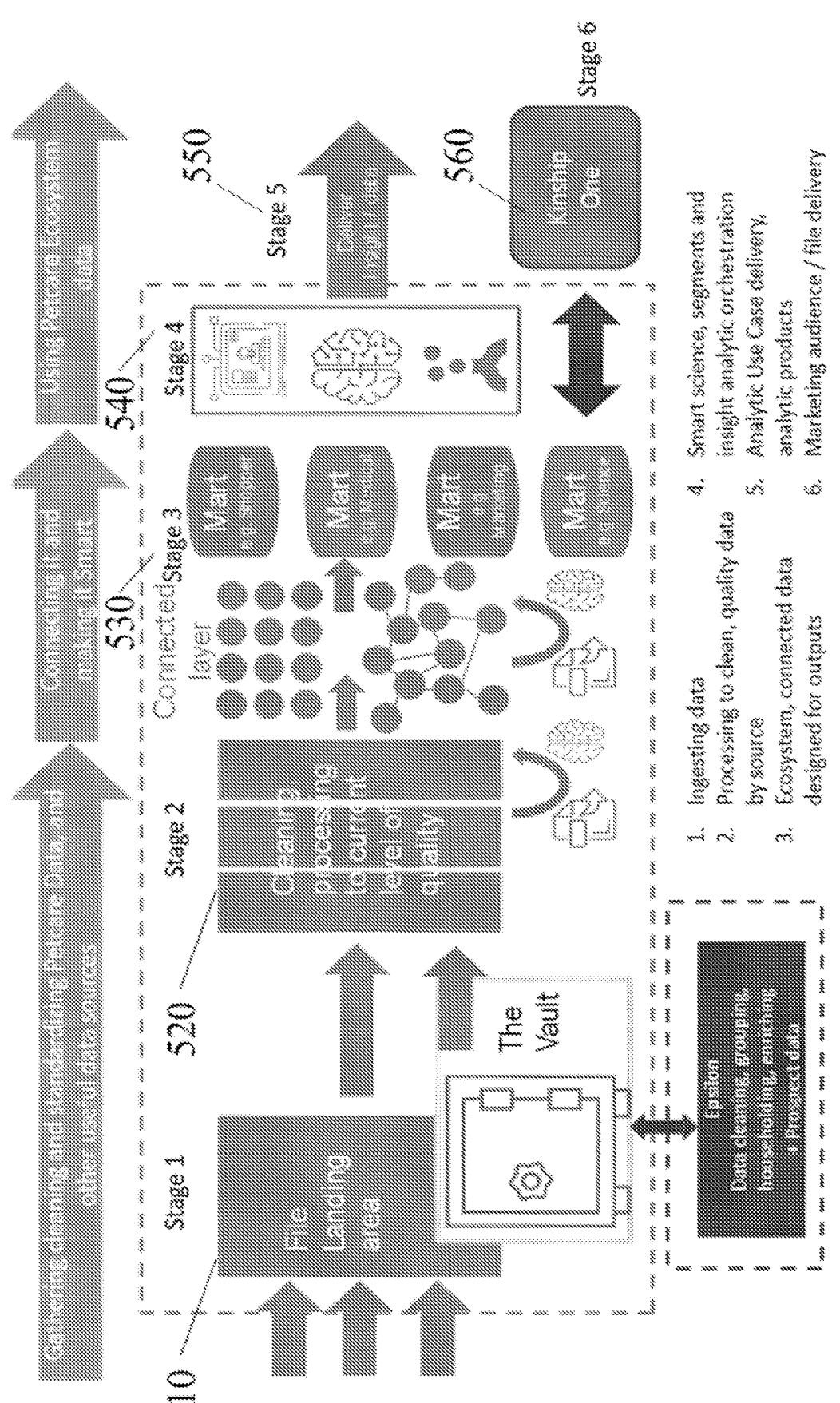
FIG. 5 illustrates a system or method for aggregation and linking according to certain non-limiting embodiments.

Once processed through data consent framework 140, the information can be forwarded to predicting tool 530, as shown in FIG. 5. Predicting tool 530, which can be a customer data platform (CDP) and/or can utilize artificial intelligence or machine learning, can link the data and create one or more consumer or user profiles. Linking of data can utilize an identity resolution process. Predicting tool 530, for example, can test for predictability of dog owners who have been to a veterinarian in the last year, for predictability of dog owners of one or more dogs who have purchased skin treatment products in the last year and/or have been to the veterinarian in the last year. In yet another example, predicting tool 530 can test for predictability of dog owners of one or more dogs who are in the toy category of dogs, purchased skin treatment products in the last year, and/or have been to the veterinarian in the past six months, or any other period of time. Different combinations of data points can be used to predict which one provide the best, greatest, or most effective response to an advertisement from the consumer and/or ultimately sales impact.

In some non-limiting embodiments, predicting tool 530 can use analysis of covariance (ANCOVA), which can be a general linear model that utilizes analysis of variance (ANOVA) and/or regression. ANCOVA can be used to evaluate whether the means of a dependent variable (DV) are equal across levels of a categorical independent variable (IV), which can be referred to as a factor or treatment, while statistically controlling for the effects of other continuous variables that are not of primary interest, which can be referred to as covariates (CV) or nuisance variables. Although ANCOVA can be used when there are differences between your baseline groups, it can also be used in pre-test or post-test analysis when regression to the mean can affect your post-test measurement.

In certain non-limiting embodiments, ANCOVA can be used as an extension of multiple regression analysis. Similar to regression analysis, ANCOVA can be used to evaluate how independent variables act on dependent variables. ANCOVA, in non-limiting embodiments, can remove any effect of covariates. For example, ANCOVA can be used to determine if a new drug works for depression, with three treatment groups and one control group. ANCOVA can be used to determine if the treatment works, while controlling for other factors that can influence the outcome, such as family life, job status, or drug use. In other non-limiting embodiments, ANCOVA can be used as an extension of ANOVA to control for covariates and/or test combinations of categorical or continuous variables as predictors. In some non-limiting embodiments the covariates can be variables of interest, rather than variables that are controlled.

ANCOVA can be used to test or explain within-group variance. For example, ANCOVA can take the unexplained variances from the ANOVA test and explain the unexplained variances with confounding variables, or one or more other covariates. Weak covariates can reduce the statistical power of the test, while strong covariates can increase the statistical power of the test. In certain non-limiting embodiments, the following process or method can be performed: perform a regression between the independent and dependent variables, identifying the residual values from the results of the performed regression, run an ANOVA on the residual values, and inserting the assumptions for ANCOVA. The assumptions can include at least two independent variables as categorical variables, dependent variables and covariates can be continuous, such as measured on an interval scale or ratio scale, and/or ensure observations are independent.

After performance of the ANVOCA analysis, a P-value can be calculated. In certain embodiments, the p-value can represent the probability of obtaining results at least as significant as observed results of a statistical hypothesis test, wherein it can be assumed that the null hypothesis is correct. In certain non-limiting embodiments, the p-value can be used as an alternative to rejection points to provide the smallest level of significance at which the null hypothesis can be rejected. The p-value can be inversely proportional to support that the alternative hypothesis is correct, meaning that the smaller the p-value, the greater the probability that the alternative hypothesis is correct. In certain non-limiting embodiments, a calculated p-value indicating approximate 80% confidence can be selected. In alternative embodiments, a calculated p-value indicating a greater than approximately 80% confidence can be selected. In such non-limiting embodiments, calculation of the p-value can occur multiple times after ANCOVA analysis. In further non-limiting embodiments, the calculated p-value indicated a less than approximately 80% confidence can be selected. In alternative embodiments, a new ANCOVA analysis can occur after calculation of a p-value that indicates less than a desired degree of confidence. In further alternative embodiments, calculation of a p-value need not be performed at all.

In certain non-limiting embodiments, data cleansing or cleaning can be utilized. Data cleansing or cleaning can be used to detect, correct, and/or remove corrupt or inaccurate records from a record set, table, or database. For example, data cleansing or cleaning can include identifying incomplete, incorrect, inaccurate, or irrelevant parts of the data and/or replacing, modifying, or deleting the dirty or coarse data. Data cleansing can be performed interactively with data wrangling tools, or as batch processing though scripting. In certain non-limiting embodiments, data cleansing or cleaning can result in no changes to the data. For example, data cleansing or cleaning might detect that there are no errors in the data. Alternatively, and without limitation, the data cleansing or cleaning can be configured to ignore certain errors. Further, the data cleaning or cleaning can be configured to identify commonly misidentified errors, for example, data that is often identified as an error, but which should still be included in the resultant data set.

After cleansing, a data set can be consistent with other similar data sets in the system. The inconsistencies detected or removed could have been originally caused by, for example, user entry error, corruption in transmission or storage, or different data dictionary definitions of similar entities in different stores. In some non-limiting embodiments, data cleansing or cleaning can differ from data validation in that validation can mean data is rejected from the system at entry and can be performed at the time of entry, rather than on batches of data. Data cleansing or cleaning, for example, can involve removing typographical errors or validating and/or correcting values against a known list of entities. The validation can be strict, such as rejecting any address that may not have a valid postal code, or fuzzy, such as correcting records that partially match existing or known records. In certain non-limiting embodiments, data cleansing solutions can clean data by cross-checking with a validated data set. Data cleansing can also include data enhancement, in which data can be made more complete by adding related information. For example, addresses can be appended with one or more phone numbers. In some other embodiments, data cleansing can include harmonization (or normalization) of data, which can include bringing together data of varying file formats, naming conventions, and columns, and/or transforming the data into one cohesive data set. For example, abbreviations such as st, rd, etc., can be expanded to street, road, etcetera.

An identity can refer to the anonymous profile of a consumer gathered across one or more user equipment or devices. For example, building the identity of a person can include combining data gathered from laptop browsers, cell phones, email subscriptions, and/or offline purchases into a pool. The combined data can then be anonymized so that marketers, or any other entity or person with access to the identity, would not have access to the identifying information of the consumer. The personal identification information, for example, can be a name, email address, phone number, or street address. In some non-limiting embodiments, other information related to the consumer, such as gender, age, location, and/or purchasing or browsing activities of the consumers, can be included as part of the identity, which can be reviewed by marketers or any other entity or person with access to the identity. In certain non-limiting embodiments, identity resolution can be the compiling of all information into one profile. For example, the identity resolution can indicate that the consumer conducts business activities on one browser, but conduct personal activities, such as personal shopping, on a second different browser. In yet another example, the identity resolution can indicate that the consumer's mobile device includes more data or better reflects consumer habits during non-work times, such as television shows they prefer or personal items they search for in one or more internet browser. The identity resolution provides marketers, or any other entity or person with access to the identity resolution, a holistic view of the consumer. Identity resolution, therefore, can connect may different identifiers from multiple platforms and/or devices to allow people-based targeting, personalization, or measurement. In some non-limiting embodiments, the identity resolution can be built or aggregated in real-time.

Figure 2:
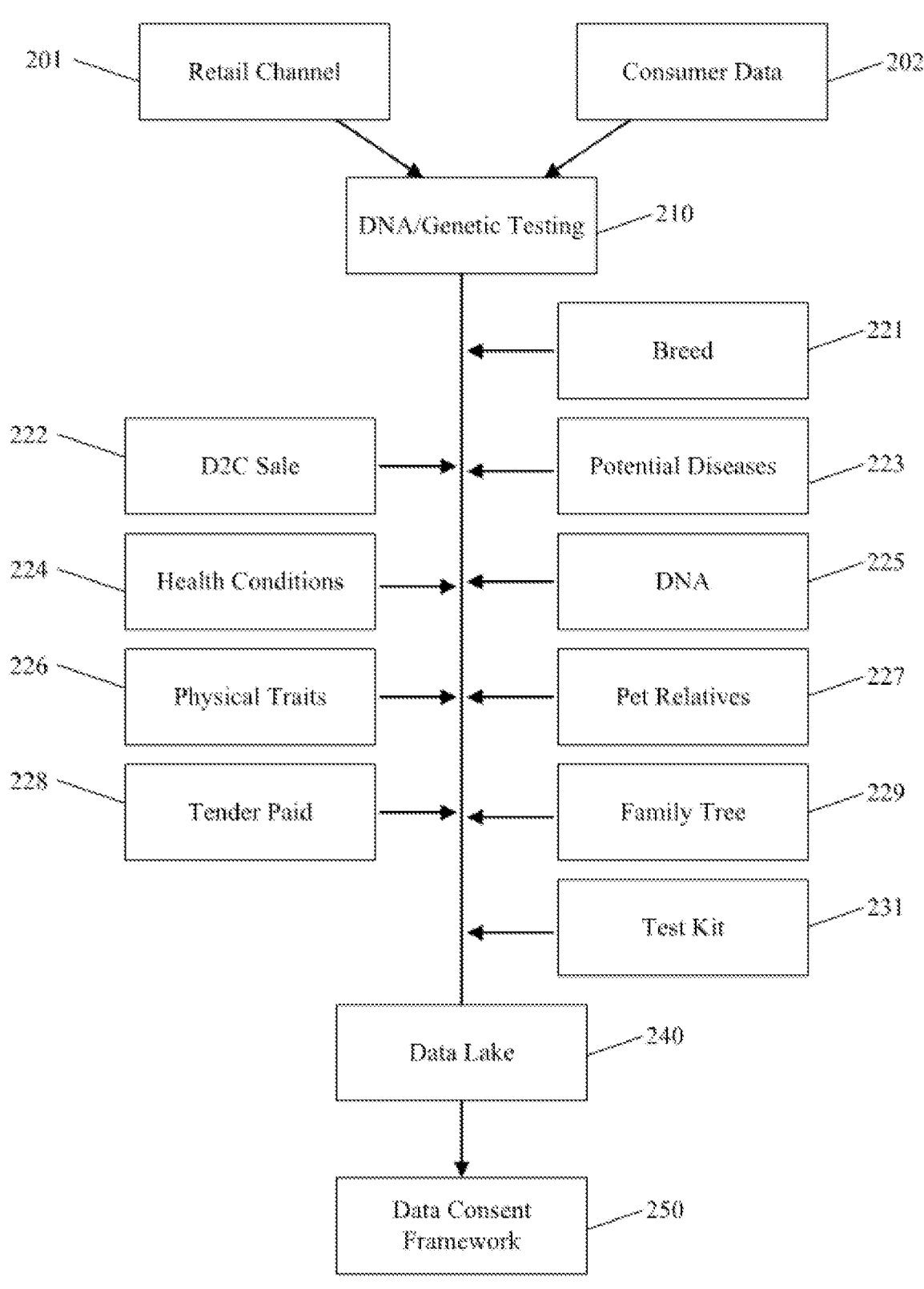
FIG. 2 illustrates a system for data collection or aggregation according to certain non-limiting embodiments.

FIG. 2 illustrates a system for data collection or aggregation according to certain non-limiting embodiments. In particular, FIG. 2 illustrates a DNA or genetic testing service 210 for pets. The DNA or genetic testing service 210 can be one of the sources from which data can be collected and aggregated. In certain non-limiting embodiments, DNA or genetic testing service 210 can initially collect information from retail channel 201 and/or consumer data 202. Retail channel 201 and consumer data 202 can be similar to retail channel 101 and consumer data 102 shown in FIG. 1.

DNA or genetic testing service 210 can be in the form of an in-home testing kit provided to pet owners and/or a test performed by a veterinarian. For those embodiments involving in-home test kit, a testing kit can be purchased by a pet owner. The pet owner can then use one or more swabs from the testing kit to collect skin cells from the pet's mouth. For example, the pet owner can swab the inside of the pet's cheek. Once the sample is collected, the pet owner can mail the sample to a lab for analysis. In certain non-limiting embodiments, a pet owner can be asked to use the internet to activate the in-home test kit. As part of the activation the pet owner can be asked to answer one or more questions related to the pet or pet owner. These answers can be collected as consumer data 202.

The DNA or genetic testing service 210 can be used to determine and collect a variety of biological, physical, health, or ancestry information related to the pet. For example, pet breed 221, potential diseases 223, health conditions 224, DNA information 225, physical traits 226, pet relatives 227, and/or family tree 229 can be collected. Other information can include direct to consumer sale 222, tender paid 228, and/or test kit 231. For example, consumer sale 222 can include any product or service sold on an online web site or in-store. Tender paid 228 can include information collected from the purchasing of a product or service using a payment card. Test kit 231 can be a DNA or disease test kit. The raw data collected from DNA or genetic testing service 210 can be forwarded to data lake 240. The data can then be forwarded to data consent framework 250, which can be similar to data consent framework 140. Once processed through data consent framework 250, the information can be forwarded to predicting tool 530, as shown in FIG. 5. Predicting tool 530, which can be a CDP, can then link the data and create one or more consumer or user profiles.

Pet breed 221 can include dog breeds, cat breeds, or a breed for any other pet or animal. Some examples of dog breeds can include Affenpinscher, Afghan Hound, Afghan Shepherd, Aidi, Airedale Terrier, Akbash, Akita, Alano Espanol, Alaskan husky. Some examples of cat breeds can include Abyssinian, Aegean, American Bobtail, American Curl, American Shorthair, American Wirehair, Aphrodite Giant, Arabian Mau, and Asian cat. Potential diseases 223 can be diseases specific to dogs, cats, or any other pet. For example, dog diseases can include abnormal development of the elbow, abnormal eyelids, abnormal growth in lower intestines, abnormal heath rhythm, abnormal molar development, abnormal passage between artery and vein, abnormal passageway between the mouth and nasal cavity, abnormal protein production, abnormal urine outflow due to urinary bladder dysfunction, or any other dog related disease. Cat disease, for example, can include abnormal cavity inflammation, abnormal diaphragm opening, abnormal eyelid, abnormal growth in the lower intestines, abnormal heart rhythm, abnormal passage between artery and vein, abnormal passageway between the moth and nasal cavity in cats, abnormal protein production, abscesses, or any other cat related disease.

Figure 3:
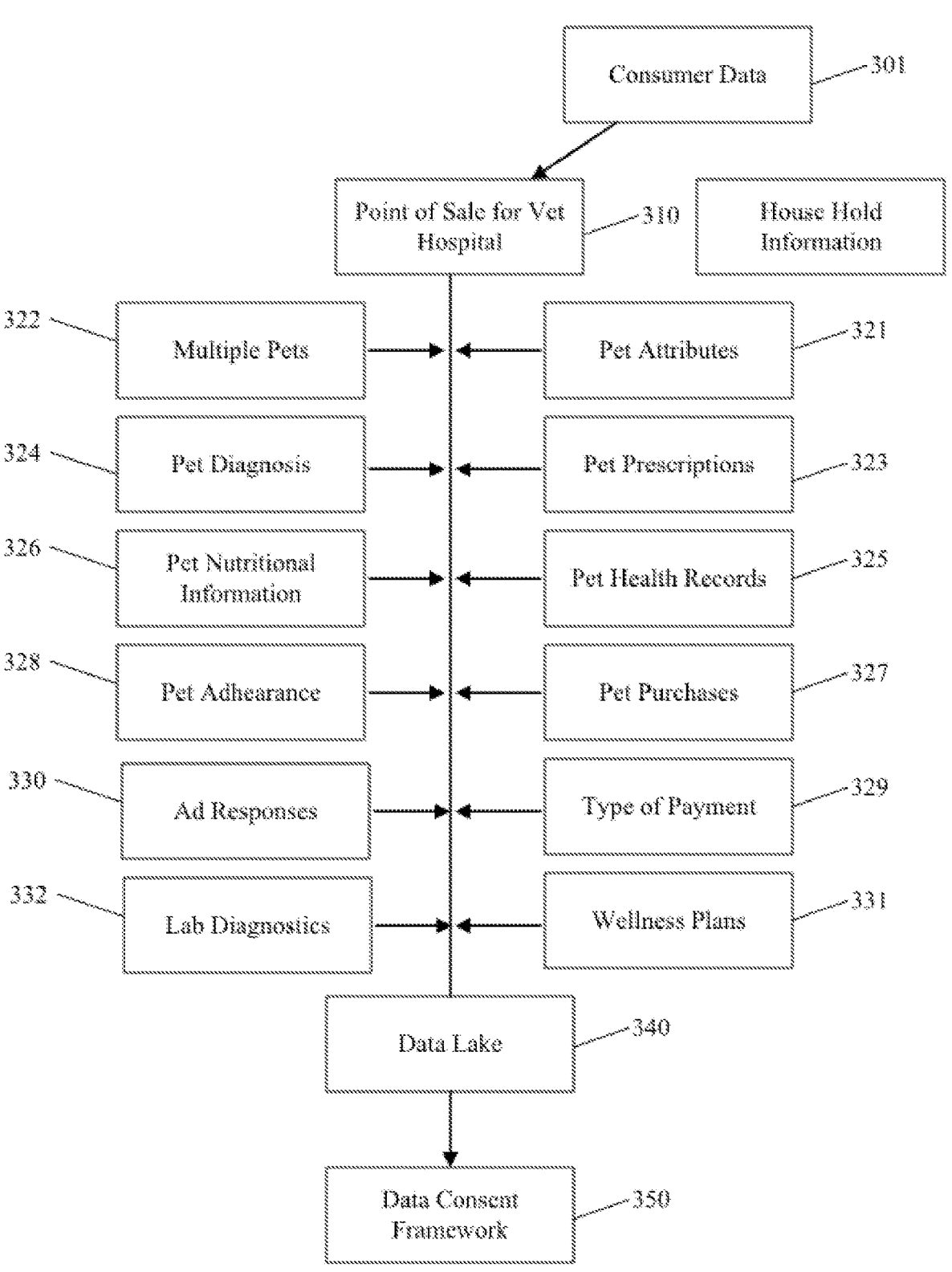
FIG. 3 illustrates a system for data collection or aggregation according to certain non-limiting embodiments.

FIG. 3 illustrates a system for data collection or aggregation according to certain non-limiting embodiments. In particular, FIG. 3 illustrates information obtained from a pet healthcare facility, such as a veterinary facility or hospital. The information can be obtained from the POS device of veterinary hospital 310, or any other device in the veterinary hospital with access to pet data, such as pet medical charts or records. The data collected or aggregated by POS device of veterinary hospital 310 can be a variety of biological, physical, or health data related to the pet. For example, pet attributes 321, multiple pets 322, such as the number of pets owned by a given pet owner, pet prescription 323, such as any medication, drug, or treatment prescribed to the pet, pet medical or health diagnosis 324, pet health records 325, pet nutritional information 326, such as any information related to the nutritional consumption of the pet, pet adherence 328, wellness plans 331, and/or lab diagnostics 332. Pet adherence 328 can be adherence of the pet to a medical treatment or routine prescribed by veterinarian and/or behavioral adherence to the pet owner. Other collected data can include, house hold information, pet purchases 327 using the POS device, advertisement responses 330 to those advertisements shown on the POS device or at the veterinary hospital, or type of payment 329, whether it be credit, debit, store credit, virtual currency, online payment, cash, and/or a co-payment for those pet owners with pet insurance. Pet purchases 327 can include, for example, pet treats or pet food, toys, nutrition, snacks, clothing, collars, leashes, harnesses, crates, kennels, apparel, pharmaceutics, beds, flea and tick products, gates, doors, health and wellness products, bowls, internet of things devices, genetic testing products, insurance, wellness plans, and/or tracking devices.

Advertisement responses 330 can include, for example, responses to a post-campaign analysis (PCA). In certain non-limiting embodiments, a marketing or advertising campaign can use advertisement responses to assess the performance of the campaign toward building brand awareness, influencing consideration, driving action and/or engagement. The metrics used to evaluate the effectiveness of the advertising or marketing campaign can be, for example, cost per value view (CPVV), percentage of targeted audience reached, frequency, which can be the time advert served to a consumer across one or more different channels, view through rate, which can be a measurement of the percentage of the video watched, positive earned media, which can be a measurement of where people have shares the content positively, and/or brand buzz, which can relate to the number of conversations taking place around of brand involved in the campaign. In some non-limiting embodiments, the metrics used to evaluate influencing consideration and/or driving action can include, for example, quality score, click-through rate, impressions, average position, and/or conversion rate, which can be how many people who clink on an advertisement go through to perform a desired action on the advertised website. In other non-limiting embodiments, the metrics used to evaluate driving action and/or engagement can include, for example, total traffic, traffic by channel, bounce rate, which can be the percentage of visitors who leave before performing a desired action, conversions, which can be a quantifiable measure of how visitors have performed a desired action, or data capture, which can be the quality of data obtained from visitors arriving at a web site.

The POS device can include an electronic cash register and/or software to coordinate data collected from daily purchases. Retailers can increase functionality by installing a network of data-capture devices, such as card readers or barcode scanners. Consumers can be identified by the POS, for example, by using a customer or loyalty card, an e-mail address, a phone number, or through payment card information. In some non-limiting embodiments POS devices can be used to monitor inventory and buying trends, help retailers avoid customer service issues, such as out-of-stock sales, and tailor purchasing and marketing to consumer behavior. The collected data can then be forwarded to data lake 340 for aggregation. Data consent framework 350 can then receive or obtain aggregated data from data lake 340.

In certain non-limiting embodiments the data collected from one or more of the sources shown in FIGS. 1, 2, and/or 3 can be healthcare data that includes personal or personable identifiable information (PII) of the pet or pet owner. For example, DNA 225 in FIG. 2 and pet health records 325 in FIG. 3 can include PII. This PII can be removed either before or after aggregation of the data in data lake 130, 240, and 340. In certain embodiments, data consent framework 140, 250, and/or 350 can be a CDP used to remove the PII from the collected or aggregated data. For example, the consumer data can be brought into an area with limited access with data/network security. The names and/or addresses can then be removed and a pseudoanonymous identification can be assigned. Thereafter, consumer data can be used with the pseudoanonymous identification. In some other embodiments data consent framework 140, 250, and/or 350 can be a data management platform (DMP).

For example, as described above the data consent framework 140, 250, and/or 350 can be used to remove the PII from the collected or aggregated data. In certain non-limiting embodiments, the PII can be transmitted to an area with limited access, such as within an internal network of a marketer or entity, using data or network security. The names, address, or any other PII can be removed, and a pseudoanonymous ID can be assigned. Any usage of the consumer data can then be done using the pseudoanonymous ID, rather than any PII. The pseudoanonymous ID can then be matched to one or more third parties using, for example, SHA-256 Cryptographic Hash Algorithm.

A cryptographic hash, which can also be referred to as a digest, can be a type of signature for a text or data file. SHA-256 Cryptographic Hash Algorithm, for example, can generate an almost unique 256-bit (32-byte) signature for a text. A hash, in certain non-limiting embodiments, is not an encryption, meaning that it cannot be decrypted to the original text. Hashed versions of texts can be compared to one another, as opposed to comparing the original text.

Any other data, whether first-party, second-party, and/or third-party data, can be collected and aggregated. The data, for example, can include symptoms from animals, patient observations, health reports, lab results, treatment plans, nutritional logs, activity-based information, genetics from animals, interest-based reading by pet owners, media exposure by pet owner, purchasing habit by pet owner, spending by pet owner, and/or insurance contracts of owner.

Once collected and/or aggregated, the data in data lake 130, 240, and 340 can be classified into datasets based on one or more attributes. The attributes can be categories or classifications that describe each dataset. For example, datasets can be attributed to the pet's health, the pet owner, such as consumer data, physical or behavioral traits of a dog or cat, and/or any other attribute. The health dataset can include information related to veterinary clinics and hospitals, for example, consumer pet ownership data, diagnostics, number of visits in a given time period, prescriptions, pet body condition score, cat age range, dog age range, cat age category, and/or dog age category. The pet body condition score can be the pet version of body mass index for humans. In certain non-limiting embodiments, the pet body condition score can be a determination made by a veterinarian professional to indicate a classification of thin, underweight, ideal, overweight, or obese. For example, the pet body condition score can range from 1-5, with 1 (1/5) being very thin or thin, 2 (2/5) being underweight, 3 (3/5) being ideal weight, 4 (4/5) being overweight, and 5 (5/5) being obese. In another example, the pet body condition score can range from 1-9, with 1 (1/9) being emaciated, 2 (2/9) being very thin, 3 (3/9) being thin, 4 (4/9) being underweight, 4.5 to 5 (4.5 or 5/9) being ideal weight, 6 (6/9) being overweight, 7 (7/9) being overweight, 8 (8/9) being obese, and 9 (9/9) being severely obese.

In certain non-limiting embodiments, a score of 1/5 or 1/9 can be assigned to pets with ribs, backbone, or pelvic bones sticking out, loss of muscle mass presented, and/or severe tummy tuck and dramatic waistline. 1.5/5 or 2/9 can be assigned to pets with ribs, backbone, or pelvic bones being visible, but only minor loss of muscle mass, and/or severe waistline and tummy tuck. A score of 2/5 or 3/9 can be assigned to pets with ribs, pelvis, or backbone easily palpated and somewhat visible, and/or severe waistline and tummy tuck. A score of 2.5/5 or 4/9 can be assigned to pets with ribs, pelvis, or backbone easily palpated but not as visible, and/or obvious waistline and tummy tuck. A score of 3/5 or 5/9 can be assigned to pets with ribs, pelvis, or backbone palpable with a thin layer of fat covering, waistline and tummy tuck obvious but not severe with more gradual curves, and/or having minimal abdominal fat pad in front of the rear legs. A score of 3.5/5 or 6/9 can be assigned to pets with slight fat layer over ribs, backbone, or pelvis making them more difficult to palpate, tummy tuck present but minimal, waistline being visible, but not prominent, and/or minimal fat pad. A score of 4/5 or 7/9 can be assigned to pets with ribs covered with heavy fat layer requiring finger pressure to feel, difficult to feel backbone or pelvis, waistline not apparent, tummy tuck being slightly visible, and/or moderate abdominal fat pad. A score of 4.5/5 or 8/9 can be assigned to ribs, pelvis and backbone covered with thick fat layer and palpable with extreme pressure, and/or no tummy tuck or waistline. A score of 5/5 or 9/9 can be assigned to ribs and backbone not palpable under thick fat layer, abdominal distention projects downward, which can be the opposite of tummy tuck, outward or protruding waistline, fat deposits on legs, face, or over tail head covering pelvis, and/or having extensive abdominal fat pad and sagging bellies. In some non-limiting embodiments, a BCS of 4.5 or 7/9 can correlate to 30% body fat, or any other body fat percentage.

The dog age range, also referred to as the dog's lifestage, can be categorized as young (less than or equal to 5 years old), midlife (greater than 5 years old and less than or equal to 9 years old), senior (great than 9 years old and younger than or equal to 13 years old), and super senior (greater than 13 years old). In some other non-limiting embodiments, the dog's lifestages can be categorized as puppy (neonate until reproductive maturity), junior (reproductively mature, still growing), adult (finished growing, structurally and socially mature), mature (from middle up to approximately the last 25% of expected lifespan, which can be a window of time around half life expectancy for breed), senior (from maturity to life expectation, approximately the last 25% of expected lifespan), and/or geriatric (at life expectancy to beyond). The cat age range, also referred to as the cat's lifestage, can be kitten (birth to 6 months), junior (7 months to 2 years), prime (3 years to 6 years), mature (7 years to 10 years), senior (11 years to 14 years), and geriatric (greater than 15 years). The given time period for the number of visits can be 3 months, 6 months, 12 months, 24 months, 36 months, or any other time period ranging from 0 to 144 months. In certain non-limiting embodiments, the kittens can be 0 to 6 months, junior can be 6 months to 2 years, prime can be 3 years to 6 years, mature can be 7 to 10 years, and/or senior can be 11 years or older.

The pet ownership dataset can include any information related to the pet owner, such as cat or dog ownership number, meaning the number of cats or dogs owned by a given pet owner, age of owner, any other consumer related data, or any other demographics information related to the pet owner. The consumer related data can include, for example, household income, home ownership, spending habits, geolocation, lifestyle attributes, weather patterns, environmental data, and/or household purchase habits. In some non-limiting embodiments, the physical or behavioral traits of a dog or cat dataset, can include, for example, activity data, daily scratching minutes, nutrition consumption, bionomic data, and/or genetics and location data. The one or more databases can include some overlap, meaning there may be some common data included in multiple databases.

C. Linking Data and Predicting Audiences or Products

As described above, in certain non-limiting embodiments linking data can be performed or done using identity resolution. Identity can refer to the anonymous profile of a consumer gathered across one or more user equipment or devices. For example, building the identity of a person can include combining data gathered from laptop browsers, cell phones, email subscriptions, and/or offline purchases into a pool. The combined data can then be anonymized so that marketers, or any other entity or person with access to the identity, would not have access to the identifying information of the consumer. The personal identification information, for example, can be a name, email address, phone number, or street address. In some non-limiting embodiments, other information related to the consumer, such as gender, age, location, and/or purchasing or browsing activities of the consumers, can be included as part of the identity, which can be reviewed by marketers or any other entity or person with access to the identity.

Identity resolution can be the compiling of all information into one profile. For example, the identity resolution can indicate that the consumer conducts business activities on one browser, but conduct personal activities, such as personal shopping, on a second different browser. In yet another example, the identity resolution can indicate that the consumer's mobile device includes more data or better reflects consumer habits during non-work times, such as television shows they prefer or personal items they search for in one or more internet browser. The identity resolution provides marketers, or any other entity or person with access to the identity resolution, a holistic view of the consumer. Identity resolution, therefore, can connect may different identifiers from multiple platforms and/or devices to allow people-based targeting, personalization, or measurement. In some non-limiting embodiments, the identity resolution can be built or aggregated in real-time.

In other non-limiting embodiments, rather than using identity resolution the linking of data can be performed based on device identification linking. Device identification linking can match a list of cookie identifications, such as petcare identifications, to one or more mobile device identifications, such as Identifier for Advertisers (IDFA) or Google or Android advertising identification (GAID). A probabilistic device graph can be used as part of the device identification linking. In some non-limiting embodiments, a deterministic graph can be used to perform matches obtained from several providers and indexed on the same identifications. When both the probabilistic graph and deterministic graph indicate a device link, the device identification link can be said to be a true positive or accurate match.

In some non-limiting embodiments, the probabilistic graph can indicate a link without the deterministic graph indicating a similar device link. Such embodiments can occur when the deterministic graph is unaware of one or more device identifications included in the link. Given that the deterministic graph can be unaware of the one or more device identifications, the veracity of the link can be deemed unknown and can be left out of the device identification linking analysis. In other non-limiting embodiments, the deterministic graph can be aware of one or more device identifications, but the one or more device identifications can be linked to identifications other than those shown as being linked in the probabilistic graph. These other embodiments are known as an inaccurate match or false positive. When a link is neither in the probabilistic nor the deterministic graph, the link can be referred to as a potential link. The potential link can be counted as a true negative or can be unaccounted for as part of the process or analysis.

In certain non-limiting embodiments, the deterministic graph can show a link between two or more devices, while the probabilistic graph does not show a similar link between puted. Accuracy, for example, can be the rate of true positive to all positive, which can be calculated using the following equation:

$$\left(\frac{\text{true positive}}{\text{true positive} + \text{false positive}}\right).$$

Reach, for example, can be the rate of true positive to all true links, which can be calculated using the following equation:

$$\left(\frac{\text{true positive}}{\text{true positive} + \text{false negative}}\right).$$

The calculated measurement of accuracy and/or reach using the above equations can be the lower bound on the true statistic. For example, the calculated accuracy can be about 90% and the reach can be about 75%. In another example, the accuracy can range from about 65% to about 97%, while reach can range from 20% to 80%. Increasing accuracy by about 2-3% can decrease reach by about 50%.

In some non-limiting embodiments, linking can include associating or aggregating the multi-touch points of the consumer. For example, a single consumer may have two e-mail addresses, such as a personal e-mail address and a business e-mail address. To link the two e-mail addresses, information or data from consumer database companies can be used. The consumers full name, physical address, and/or electronic e-mail addresses can then be linked to one profile or identity resolution. The profile or identity resolution can also include other attributes of the consumer, for example, mailing address, telephone number, cellphone number, pet attribute, gender, and/or any other attribute.

Figure 4:
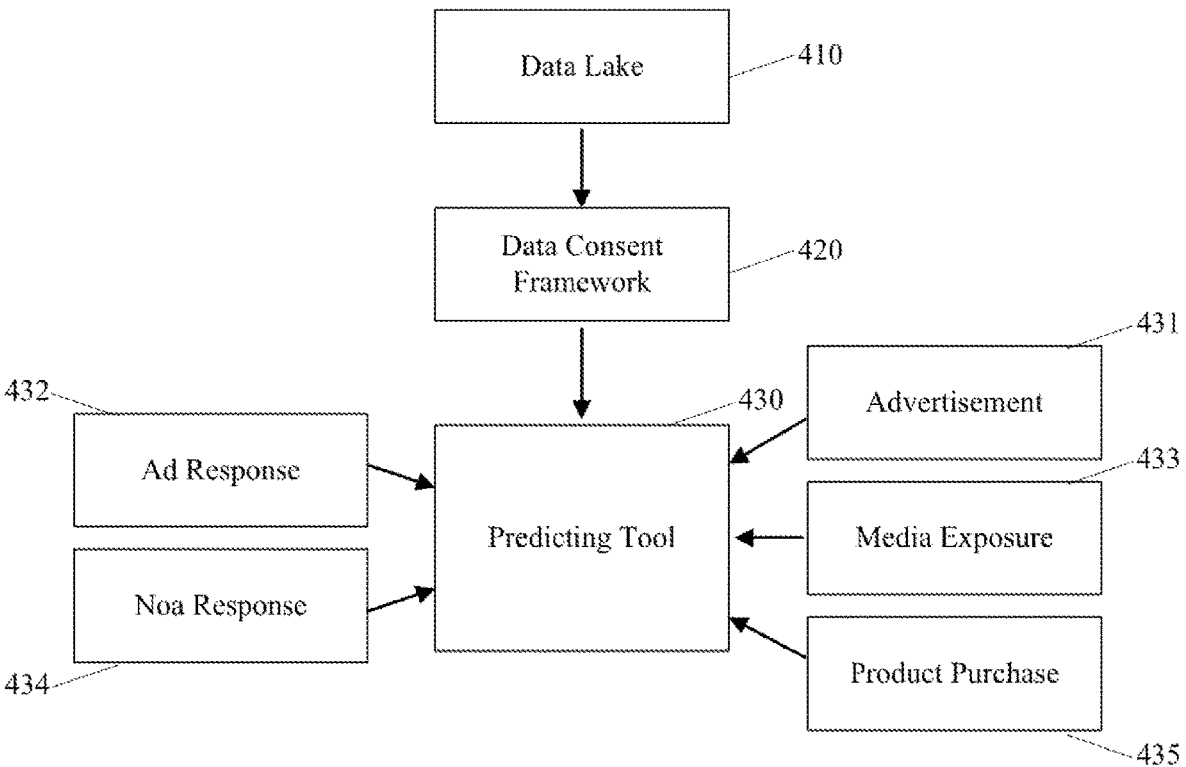
FIG. 4 illustrates a system of linking according to certain non-limiting embodiments.

FIG. 4 illustrates a system of linking according to certain non-limiting embodiments. In particular, FIG. 4 can include data lake 410, which can be similar to data lakes 130, 240, and 340, and data consent framework 420, which can be similar to data consent framework 140, 250, and 350. The data included in the one or more datasets can be harnessed to create a healthcare profile of a pet. The profile can be created using any attribute known about the pet. For example, the profile can include the following information:

TABLE 1

Example of Pet Profile.

| Pseudonymous ID | Breed | Spend at VCA | Healthplan | Prescribed Product | Pet Age | Pet BCS | Pet Tracker |
|---|---|---|---|---|---|---|---|
| 123124 | Boxer | $ 200 | No | Royal Canin | 4 | Ideal | Yes |
| 1241245 | Pug | $ 5,000 | Yes | Hills | 1 | Ideal | Yes |
| 251524 | Bulldog | $ 412 | No | Royal Canin | 6 | Ideal | Yes |
| 53552 | Westy | $ 512 | Yes | None | 2 | Ideal | Yes |
| 34233 | Mixed Breed | $ 514 | Yes | None | 5 | Ideal | Yes | the two or more devices. When the probabilistic graph is unaware of at least one of the device identifications known in the deterministic graph, the link can be considered unknown. On the other hand, when the probabilistic graph is aware of the one or more devices, but simply failed to link the devices, the link can be considered a false negative.

Once the above quantities are identified (e.g. true positive, false negative, false positive, or unknown link), accuracy and reach of the device identification linking can be com- Any known CDP or data management platform (DMP) can be used to create the one or more datasets and/or the healthcare profile of the pet. Creating the one or more datasets and/or the healthcare profile of the pet can include linking the aggregated data from the one or more sources or the one or more datasets. The healthcare profile can include one or more healthcare needs of the pet. For example, the healthcare profile of a give pet can indicate that the pet has dental problems or poor dental hygiene. Predicting tool 430 can be used to predict the pet product to help fulfill the healthcare needs of the pet. For example, predicting tool 430 can determine that a certain pet chewable can help improve, solve, or address the pet's dental problem, thereby fulfilling the healthcare needs of the pet. In another example, predicting tools 430 can help to determine services, products, medicines based on one or more attributes. In certain non-limiting embodiments predicting tool can utilize an artificial intelligence or machine learning algorithm.

In some non-limiting embodiments, the predicting tool can utilize a method or process called gradient boosting for machine learning. The method or process can be initiated with a single sector data, such as pet tracking data. Decision tree learning, which includes one or more decision trees, can then be used to model multiple scenarios to compare one way of calculation to another in a stage-wise fashion. For example, based on the movement data of a pet a determination can be made that the pet can use better nutritional food to support the level of activity. After creating the change, the model can be validated using Empirical Risk Minimization (ERM). ERM can be a statistical learning theory which can define a family of learning algorithms used to give theoretical bounds on their performance. The EMR formula can be derived using the following equation:

$$\underset{\theta}{argmin}\left[\frac{1}{n}\sum\nolimits_{j=1}^{n}-\ln(p(x_j, y_j \mid \theta)) - \frac{1}{n}\ln(p(\theta))\right],$$

with a dataset of id features $x_j$ and labels $y_j$. Other non-limiting embodiments can utilize one or more analytical models, such as classification tree, regression tree, boosted tree, or bootstrapped aggregate.

In certain non-limiting embodiments, predicting tool 430 can account for advertisement 431, media exposure 433, product purchase 435, advertisement response 432, and/or non-response 434. Non-response 434 can mean that the consumer did not react and/or did not provide a data point to be measured. For example, time series data such as advertisement exposure or store purchase of petcare products can be inputted. Based on this data, models can be run to determine the next best product to offer the customer. The testing or modeling can then be run on another sample to determine if performance can be replicated without time series data. For example, for a single scenario media exposure+product purchase can yield a 90% confidence in a prediction of purchase, media exposure+product purchase+advertisement response can yield a 93.2% confidence in a prediction of purchase, and/or media exposure+product purchase+advertisement response+product purchase can yield a 93.7% confidence in a prediction of purchase. For a plurality of scenarios with different points of data inputs, however, product purchase can yield a 70% confidence in a prediction of purchase, product purchase+advertisement response can yield a 93.1% confidence in a prediction of purchase, and/or product purchase+advertisement response+product purchase can yield a 93.4% confidence in a prediction of purchase.

Product purchase 435 and advertisement response 432 can include previous behaviors of the pet owner. These one or more inputs can be processed by predicting tool 430, along with the data from the profile of the pet, to determine a pet product or service to help fulfill the healthcare needs of the pet. In other words, predicting tool 430 can not only predict the pet product or service to help fulfill the healthcare needs of the pet, but also the purchasing behavior of the pet owner of the given pet. In some non-limiting embodiments, predicting tool 430 can also be used to determine an audience for advertising or offering the pet product.

FIG. 5 illustrates a system or method for aggregation and linking according to certain non-limiting embodiments. In particular, in step 510 data can be collected from one or more sources and aggregated in a data lake. PII included within the aggregated data can then be cleaned, meaning that the PII can be removed or separated from the data. In some non-limiting embodiments the cleaned data can be sorted into one or more datasets based on the attributes. A profile of the pet can then be created based on the sorted data in the one or more datasets. A CDP, such as Epsilon, can be used to clean the PII from the aggregated data, to create the pet profile, and/or to sort the one or more datasets. As shown in step 520, the aggregated data can be cleaned and/or reformatted to a unified, threshold, or standard level of quality. After the data is at least one of aggregated, cleaned, sorted, and/or the pet profile is created, the data can be linked or connected, as shown in step 530. Data can be linked or connected to an analytic model to perform tasks that are relevant or pertinent. For example, the marketing engine can utilize breed information, but pharmaceutical attributes of the pet are not relevant. In another example, support science can consider genetics and lab diagnostics rather than nutritional data. In step 540 the linked data can be analyzed to predict the pet product based on the collected or aggregated data to help fulfill the healthcare needs of the pet. In certain non-limiting embodiments the data can be analyzed at a DMP. In steps 550 and 560, an advertisement for the pet product can be shown on a display or graphic user interface targeting the pet owner or audience member. In some non-limiting embodiments step 550 or 560 can include the use of a digital-side platform (DSP), including real-time bidding. Step 550 can include an analytics use case delivery, while step 560 can include delivering the advertisement to the pet owner or any other target audience. For example, step 550 can be relevant since the output can in summary form, without being aggregated. Step 560 can be broken down to a pseudonymous identification level to be matched with other pseudonymous identifications.

Figure 6A:
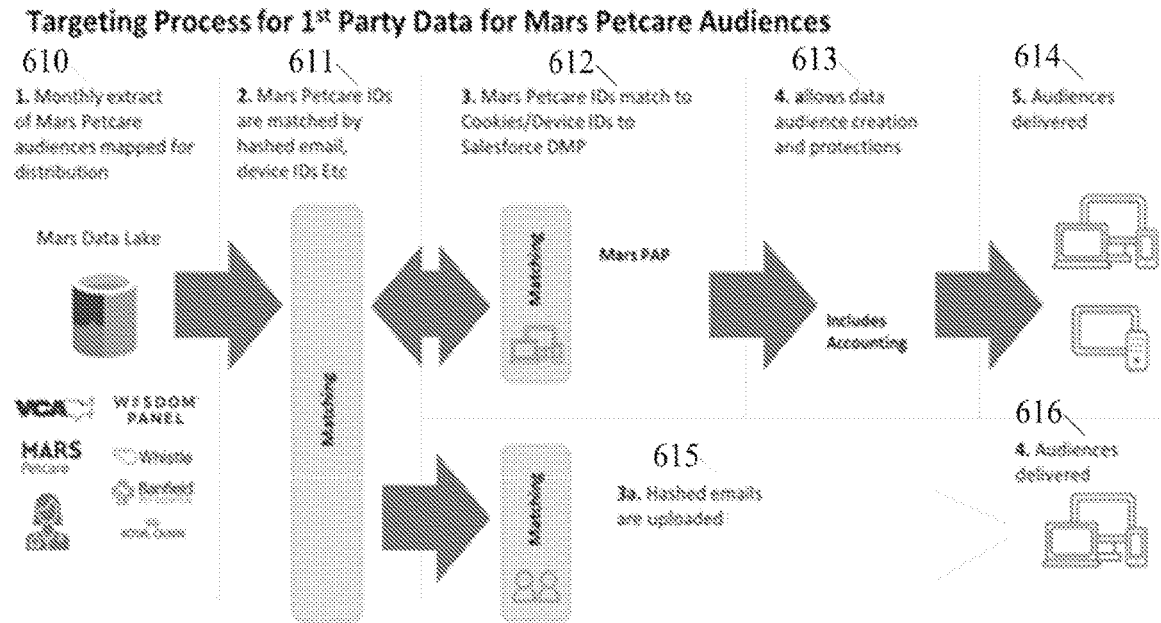
FIG. 6A illustrates a system or method for aggregation and linking according to certain non-limiting embodiments.

FIG. 6A illustrates a system or method for aggregation and linking according to certain non-limiting embodiments. In particular, FIG. 6A shows a targeting process based on first-party data. The first-party data, for example, can be collected from health or location tracking device 110, DNA or genetic testing 210, POS device at a veterinary hospital 310, and/or any other first-party source. In certain non-limiting embodiments third-party or second-party data can also be used to accompany the first-party data. As shown in step 610, the first-party data can be extracted, aggregated, and/or mapped. The data, for example, can be extracted on a discrete basis, such as hourly, daily, weekly, and/or monthly. In step 611 the data can be aggregated, sorted into datasets, and/or pet or pet owner profiles can be created. In some non-limiting embodiments step 611 can be performed by a CDP. For example, as shown in step 611 the datasets can be matched and/or the pet or pet owner profiles can be created by matching hashed e-mails, device identification, and/or any other method. A pet or pet owner profile in certain embodiments can be referred to as a petcare identifier.

In step 612 the petcare identification can be matched to a cookie or device identification and/or to a DMP. In other words, step 612 can be used to update the DMP with data. In step 613 the DMP can allow a data audience to be created. Advertisements for pet products can then be provided or transmitted to the data audience, as shown in step 614. A target audience can be the audience selected to be best to see, read, or view the advertisement. The audience can include the pet owner or any other member for whom the advertised pet products can be relevant. In certain non-limiting embodiments, step 615 can illustrate matching by having hashed e-mails uploaded to a social networking site and/or a search engine. The advertisements can then be delivered via a social networking site and/or a search engine.

Figure 6B:
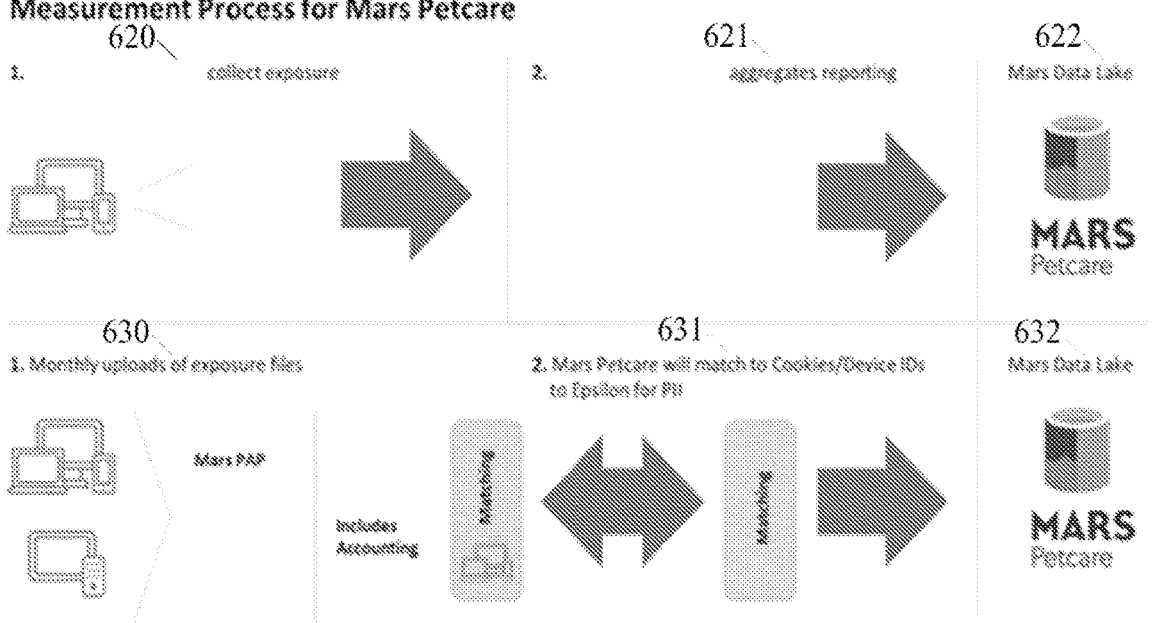
FIG. 6B illustrates a system or method for aggregation and linking according to certain non-limiting embodiments.

FIG. 6B illustrates a system or method for aggregation and linking according to certain non-limiting embodiments. In particular, FIG. 6B illustrates a system or method for measuring the effectiveness of the system or method shown in FIGS. 5 and 6A. In step 620, a search engine and/or social media network can collect measurement or metrics on the pet product advertising, referred to as exposures, in FIGS. 5 and 6A. The measurements and/or metrics can be aggregated in step 621 and forwarded to data lake 622. Data lake 622 can be similar to data lakes 130, 240, 340, and 410. In certain non-limiting embodiments, monthly uploads of exposure files can be transmitted, as shown in step 630. An exposure file can be a non-aggregated, event-level data from an advertising campaign that can be reported typically by the publisher or media entity. The data can be raw data that can be collected from advertising server logs which can include, for example, Internet Protocol (IP) address, which represents the address of the user making the request, user agent, which is a text string sent to the server by the browser providing certain identifying information about the browser, time of exposure, date of exposure, advertisement content, publisher, advertisement unit, which can identify the location of the advertisement to be placed on the publisher site, line item, which can identify respective customer campaign or creative, identification classification, and/or other information related to that event. Other measurements can include a pop-up blocker, a non-flash browser, a JavaScript disabled or incapable browser, advertisement blocking software, image rendering disable, and/or autorefresh.

In step 631 the exposure files can be matched to a cookie or device identification via a CDP. From the CDP the matched or updated data can be transmitted to data lake 632, which can be similar to data lake 622.

Figure 7:
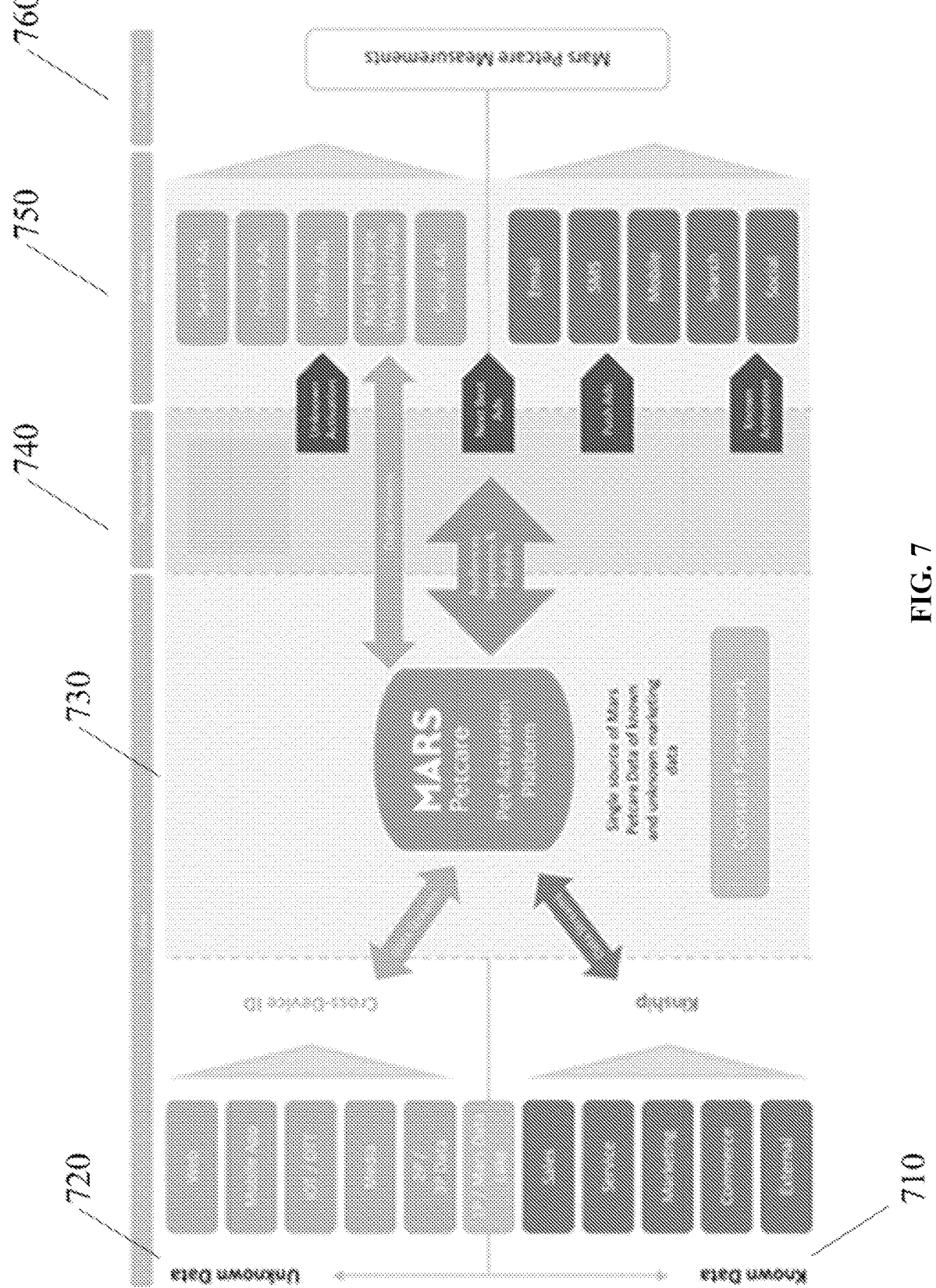
FIG. 7 illustrates a system or method for aggregation and linking according to certain non-limiting embodiments.

FIG. 7 illustrates a system or method for aggregation and linking according to certain non-limiting embodiments. FIG. 7 outlines a system for ingesting data, classification, process for handling data, and then deploying those created audiences. In particular, FIG. 7 illustrates using known data 710 and unknown data 720. Known data 710 can include sales, service, marketing, commerce, and/or any other external data. Unknown data 720 can include web, mobile application, internet of things (IOT), media information, and/or any second-party or third-party information. The known data 710 and unknown data 720 can be collected and transmitted to pet activation platform 730. Pet activation platform 730 can be similar to consent frameworks 140, 250, 350, and 420 shown in FIGS. 1-4. In some non-limiting embodiments, pet activation platform 730 can be cloud-based. Pet activation platform 730 can use information that is already compliant within data privacy and data protection regardless of region. In alternative, or in addition, pet activation platform 730 can help target audiences for known and/or unknown customers through digital marketing. Pet activation platform 730 can be used for digital experiences that can be personalized for one or more customers. In other non-limiting embodiments, pet activation platform 730 can be used to connect with third party advertising platforms.

In certain non-limiting embodiments, DMP, also referred to as a unified data management platform (UDMP), can be a centralized system for collecting and/or analyzing large sets of data originating from disparate sources. Pet activation platform 730, for example, can be a DMP. A DMP can create a combined development and delivery environment that provides one or more users with consistent, accurate, and/or timely data. As described above, at its simplest, a DMP could be a NoSQL database management system that can import data from many systems, and/or allows marketers and publishers to view the data in a consistent manner. Other DMPs, for example, can combine data management technologies and data analytics tools into a single software suite, which can include an intuitive or easy-to-navigate executive dashboard.

DMP can be used to collect structured and/or unstructured data from a range of internal and external sources, and/or to integrate and store the data. DMP can also be used to analyze or organize data to provide data-driver insight to marketing and/or advertising campaigns. For example, data incorporated into a data management platform can be first-party data, second-party data, and/or third-party data. Third-party data can be used to fill in holes in a company's own data and partner data. In certain non-limiting embodiments, any DMP known in the art can be used.

In step 740, the data can be personalized, meaning that the pet profiles can be created, audiences can be determined, and/or the healthcare needs of the pets can be predicted. Based in part on the healthcare needs of the pet, advertisements can be pushed to known e-mails, mobile devices, search engines, social networks, and/or via short message services to pet owners, as shown in step 750. This can be referred to a known activation. Alternatively, or in addition to, advertisements can target unknown activation. Unknown activation, for example, can be search advertisements, onsite advertisements, offsite advertisements, social network advertisements, and/or a designated petcare website or application. In step 760 measurements and/or metrics related to the advertisements can be collected and/or transmitted.

In certain non-limiting embodiments the advertisement, for example, can comply with interactive advertising bureau (IAB) standards. The advertisement, for example, can be a fixed size advertisement, a flexible size advertisement, a native advertisement, and/or a lightweight advertisement. The advertisements can have various sizes, which can be based on the number of pixels on a display an advertisement can occupy. The pixel size, for example, can be billboard sized, smartphone banner sized, leaderboard size, portrait size, skyscraper size, or feature phone small, medium, or large banner.

D. Results of Method and System Described Herein

Figure 8:
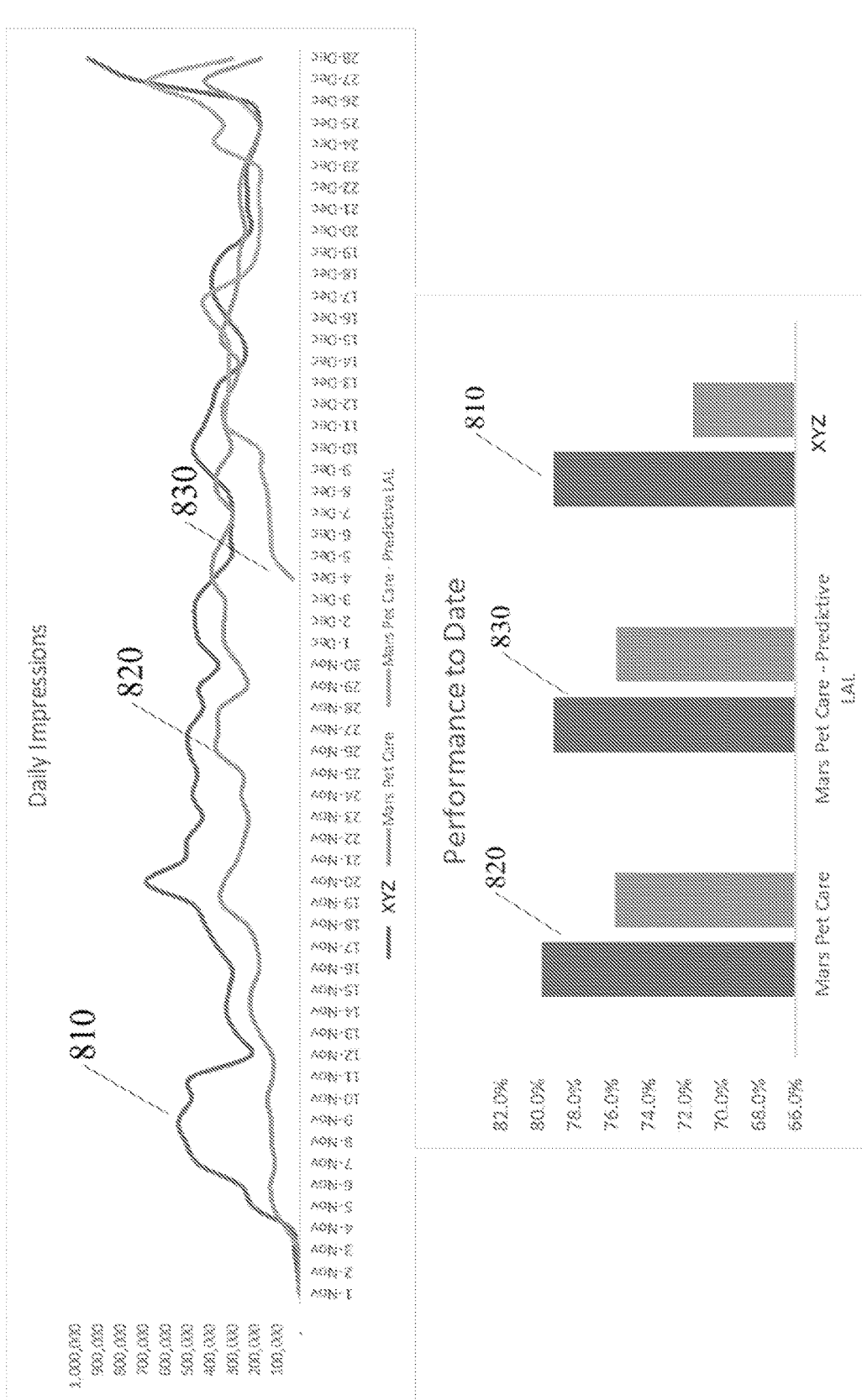
FIG. 8 illustrates a diagram according to certain non-limiting embodiments.

FIG. 8 illustrates a diagram according to certain non-limiting embodiments. In particular, FIG. 8 can illustrate daily impressions and/or performance of certain embodiments described above. As shown in FIG. 8, a daily impressions graph includes information related to XYZ 810, petcare 820, and predictive petcare 830. XYZ 810, for example, can be a purchased based targeting audience that can be built from an aggregation of audience who purchased a specific pet related product. The pet related product could have been purchased, for example, in a grocery store, drug store, mass merchandiser, e-commerce store, and/or pet specialty store. In certain non-limiting embodiments, XYZ 810 can indicates a third-party audience partner and/or the audience targeting results each day showing the total number of viewable impressions to an advertisement. Petcare 820 can indicate the collective audiences for achieving audience targeting and/or the total number of daily viewable impressions to the advertisement. Predictive petcare 830 can indicate the collective audiences for achieving audience targeting expanded to include audiences that are similar to a base audience. The line can represent the total number of daily viewable impressions to the advertisements.

In some non-limiting embodiments, predictive petcare 830 can illustrate daily impressions based on the system or method used in FIGS. 1-7. As shown in FIG. 8, predictive petcare 830 can receive more daily impressions than petcare 820. In addition, FIG. 8 can also show a bar graph showing performance to date of XYZ 810, petcare 820, and predictive petcare 830. The viewability of NCS 810, petcare 820, and predictive petcare 830 can be 78.70%, 80.30%, and 77.96%, respectively. The total conversion/matched impressions (VCR or CVR) of XYZ 810, petcare 820, and predictive petcare 830, on the other hand, can be 71.6%, 75.8%, and 75.7%, respectively. This illustrates that the system or method shown in FIGS. 1-7 provides a significant technological improvement with tremendous benefits over previously used systems.

E. Flow Diagram of Method Described Herein

FIG. 9 illustrates a flow diagram according to certain non-limiting embodiments. In particular, FIG. 9 illustrates a method 9000 performed by a system shown in FIGS. 5-7 for meeting a healthcare need of a pet. In step 910, the system can collect data from one or more disparate data sources. The one or more disparate data sources can include a health and location tracking device, a DNA or genetic testing service, or a POS device at a veterinary hospital. The data can comprise at least one of first-party data, second-party data, or third-party data. The collected data can include pet health information. In step 920, the method can include aggregating the collected data from the one or more disparate sources in a data lake. The method can also include clearing personal identification information from the aggregated data in the data lake, as shown in step 930. In certain non-limiting embodiments the method can include sorting the cleared data into one or more datasets based on one or more attributes of the pet or an owner of the pet. The one or more datasets can include at least one of pet health, pet ownership, physical or behavior traits of the pet.

In some non-limiting embodiments the method can include reformatting the data from one or more disparate data sources to a uniform level of quality. In step 940, the method can include sorting the cleared data into one or more datasets based on one or more attributes of the pet or an owner of the pet. The method in step 950 can include creating a profile of a pet based on the data included in the one or more datasets. A pet product that helps fulfill the healthcare needs of the pet can be determined in step 960. The aggregating, clearing, sorting, creating, and determining can be performed by a CDP or a DMP. In other non-limiting embodiments the method can include predicting a target audience for the advertisement of the pet product. The target audience can include the pet owner and one or more other pet owners. The determining or the predicting can use a machine learning algorithm for predicting the target audience or determining the pet product to help fulfill the healthcare need of the pet.

In certain non-limiting embodiments the method can include targeting the owner of the pet with an advertisement of the pet product, as shown in step 970. The method can also include displaying the advertisement or an offer of the pet product to the owner of the pet through a graphical user interface of a terminal device, as shown in step 980.

F. Diagrams of System or Apparatus Described Herein

Figure 10:
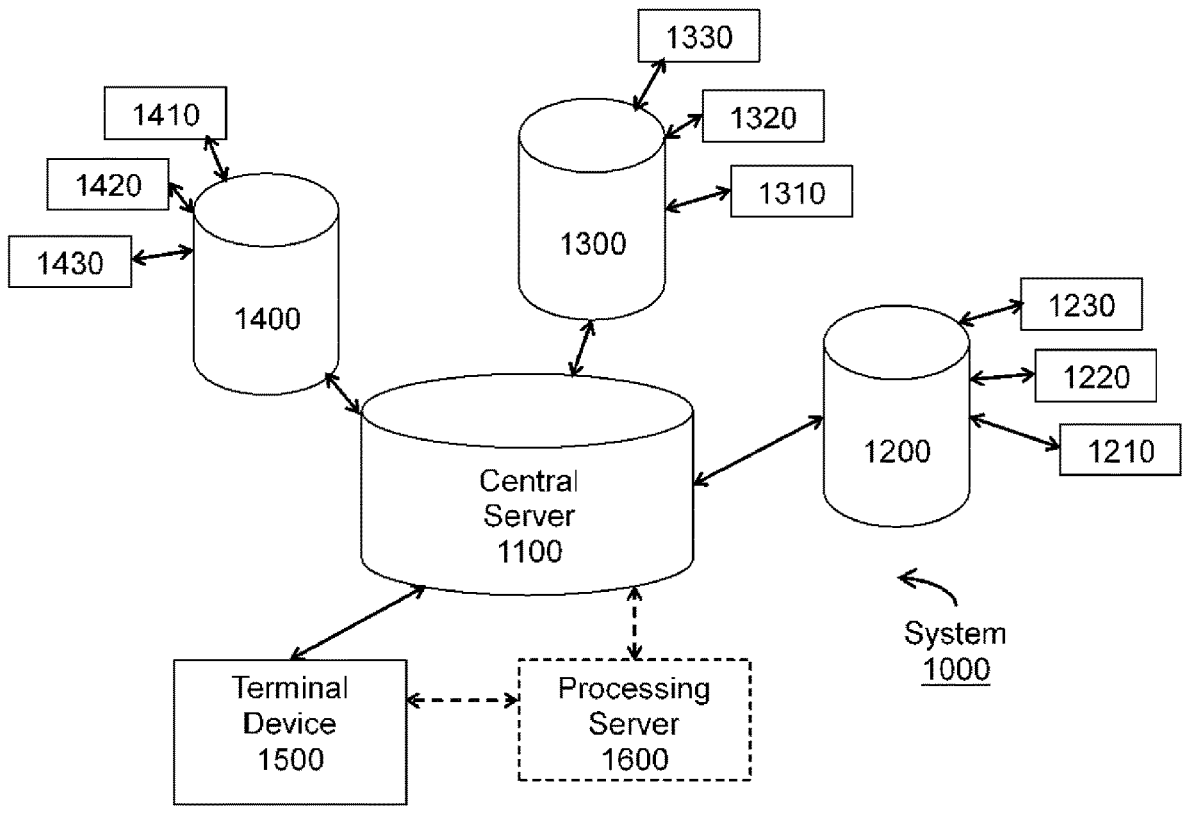
FIG. 10 illustrates a diagram of a system according to certain non-limiting embodiments.

FIG. 10 illustrates a diagram of a system 10000 according to certain non-limiting embodiments. In particular, certain non-limiting embodiments can include distributed resources that can include one or more hardware or cloud servers configured to perform any of the collecting, processing, transmitting, or storing described above in FIGS. 1-7. For example, in one embodiment of the disclosed subject matter, a system 1000 is provided. System 1000 can comprise one or more components, such as one or more servers, which can collect data from one or more sources, data lakes, data consent framework, and/or predicting tool. With reference to the embodiment of FIG. 10, for purposes of illustration and not limitation, the system can include a central server 1100, which collects data from one or more individual servers 1200, 1300, 1400. In certain embodiments, the central server 1100 can include a server computer, a desktop computer, a laptop computer, a cloud-based computing device, among other available computing devices. In some embodiments, the central server 1100 can comprise multiple computers.

Furthermore, in certain embodiments, the one or more individual servers 1200, 1300, 1400 can include a server computer, a desktop computer, a laptop computer, a cloud-based computing device, among other available computing devices. In this non-limiting embodiment, the individual servers 1200, 1300, 1400 can collect data from the one or more distributed resources 1210-1230, 1310-1330, and 1410-1430, respectively, used for processing data of a tested pet product. Distributed resources 1210-1230, 1310-1330, and/or 1410-1430 can be any imaging or non-imaging sensor. In addition to static data, such as but not limited to resource identification information including resource or host name, processor architecture (i.e., number of cores), and/or location of resource, the data collected from the resources can include, among other measurable information, memory usage and/or availability (GB), CPU speed (MHz), and start and end hour such as the time when the resource is available or running.

In the embodiment of FIG. 10, for purposes of illustration and not limitation, the collected data can be processed by at least a processing component, such as processing server 1600 of the system 1000, configured with logic to collect, analyze, process, and/or store data received from one or more resources. In certain embodiments, the processing server 1600 can include a server computer, a desktop computer, a laptop computer, a cloud-based computing device, among other available computing devices. The processing server can comprise one or more processors contained within the one or more other servers, or alternatively, and as depicted in dashed lines in the embodiment of FIG. 10, can be a standalone component configured, for example, to receive and transmit information from and to another server, such as central server 1100.

Based on the collected data, system 1000 can target an audience and/or pet owner using a pet product advertisement. The advertisements can be seen by the pet owner or audience member on terminal device 1500. Terminal device 1500 can include a PC, workstation, user equipment, and/or a mobile device. Accordingly, in some embodiments, the advertisement can be displayed on a user interface of graphical user interface.

By way of example and not limitation, in one embodiment, data related to the one or more teeth of a pet can be collected from the distributed resources 1210-1230, 1310-1330, 1410-1430, by one or more individual servers 1200, 1300, 1400, can be collected and stored in files on the individual servers 1200, 1300, 1400. The files can be any of a plurality of file types such as flat files, database files, markup language files, or the like. The central server 1100 of the embodiment herein described can receive two or more batch file transfers of the collected data from the individual servers 1200, 1300, 1400, respectively. Accordingly, the individual servers 1200, 1300, 1400 can be specifically configured with memory components and file transfer technology to manage and transmit the data to the central server over a network (not shown).

Figure 11:
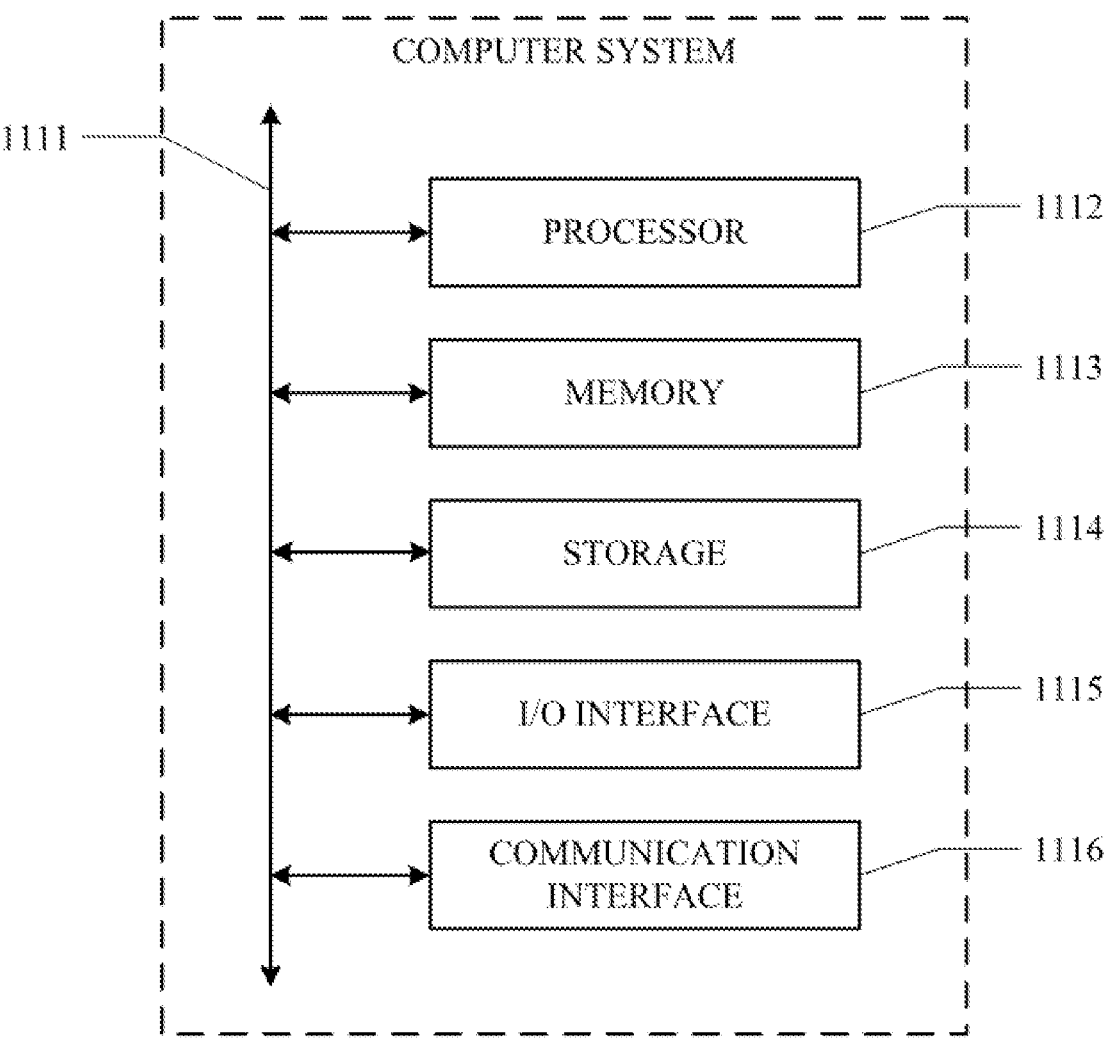
FIG. 11 illustrates a diagram of an apparatus or system according to certain non-limiting embodiments.

FIG. 11 a diagram of an apparatus or system 1110 according to certain non-limiting embodiments. In particular embodiments, one or more computer systems 1110 can perform one or more steps of the method described or illustrated herein, such as those steps shown in FIGS. 1-9. In some embodiments, one or more computer systems 1110 provide functionality of the server and/or the computing device described or illustrated herein. In certain embodiments, software running on one or more computer systems 1110 performs one or more steps of one or more methods described or illustrated herein or provides functionality described or illustrated herein. Particular embodiments include one or more portions of one or more computer systems 1110. Herein, reference to a computer system can encompass a computing device, and vice versa, where appropriate. Moreover, reference to a computer system can encompass one or more computer systems, where appropriate. Computer system 1100 can include one or more monitors, displays, and/or graphical user interfaces that allow pet owners and/or audience members to view advertisements for pet products.

This disclosure contemplates any suitable number of computer systems 1110. This disclosure contemplates computer system 1110 taking any suitable physical form. As example and not by way of limitation, computer system 1110 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1110 can include one or more computer systems 1110; be unitary or distributed; span multiple locations; span multiple machines; span multiple data centers; or reside in a cloud, which can include one or more cloud components in one or more networks. Where appropriate, one or more computer systems 1110 can perform without substantial spatial or temporal limitation one or more steps of one or more methods described or illustrated herein. As an example, and not by way of limitation, one or more computer systems 1110 can perform in real time or in batch mode one or more steps of one or more methods described or illustrated herein. One or more computer systems 1110 can perform at different times or at different locations one or more steps of one or more methods described or illustrated herein, where appropriate.

In particular embodiments, computer system 1110 includes a processor 1112, memory 1113, storage 1114, an input/output (I/O) interface 1115, a communication interface

1116, and a bus 1111. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1112 includes hardware for executing instructions, such as those making up a computer program. As an example, and not by way of limitation, to execute instructions, processor 1112 can retrieve (or fetch) the instructions from an internal register, an internal cache, memory 1113, or storage 1114; decode and execute them; and then write one or more results to an internal register, an internal cache, memory, or storage 1114. In particular embodiments, processor 1112 can include one or more internal caches for data, instructions, or addresses. This disclosure contemplates processor 1112 including any suitable number of any suitable internal caches, where appropriate. As an example and not by way of limitation, processor 1112 can include one or more instruction caches, one or more data caches, and one or more translation lookaside buffers (TLBs). Instructions in the instruction caches can be copies of instructions in memory or storage 1113, and the instruction caches can speed up retrieval of those instructions by processor 1112. Data in the data caches can be copies of data in memory or storage 1113 for instructions executing at processor 1112 to operate on; the results of previous instructions executed at processor 1112 for access by subsequent instructions executing at processor 1112 or for writing to memory or storage 1113; or other suitable data. The data caches can speed up read or write operations by processor 1112. The TLBs can speed up virtual-address translation for processor 1112. In particular embodiments, processor 1112 can include one or more internal registers for data, instructions, or addresses. This disclosure contemplates processor 8020 including any suitable number of any suitable internal registers, where appropriate. Where appropriate, processor 1112 can include one or more arithmetic logic units (ALUs); be a multi-core processor; or include one or more processors 1112. Although this disclosure describes and illustrates a particular processor, this disclosure contemplates any suitable processor.

Processor 1112 can be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors can also be implemented as a single controller, or a plurality of controllers or processors.

In particular embodiments, memory 1113 includes main memory for storing instructions for processor 1112 to execute or data for processor 1112 to operate on. As an example and not by way of limitation, computer system 1110 can load instructions from storage or another source (such as, for example, another computer system 8000) to memory 1113. Processor 8020 can then load the instructions from memory 1113 to an internal register or internal cache. To execute the instructions, processor 1112 can retrieve the instructions from the internal register or internal cache and decode them. During or after execution of the instructions, processor 1112 can write one or more results (which can be intermediate or final results) to the internal register or internal cache. Processor 8020 can then write one or more of those results to memory 1113. In particular embodiments, processor 1112 executes only instructions in one or more internal registers or internal caches or in memory 1113 and operates only on data in one or more internal registers or internal caches or in memory 1113 (as opposed to storage or elsewhere). One or more memory buses (which can each include an address bus and a data bus) can couple processor 1112 to memory 1113. Bus 1111 can include one or more memory buses, as described below. In particular embodiments, one or more memory management units (MMUs) reside between processor 1112 and memory 1113 and facilitate accesses to memory 1113 requested by processor 1112. In particular embodiments, memory 1113 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 1113 can include one or more memories 1113, where appropriate. Although this disclosure describes and illustrates particular memory, this disclosure contemplates any suitable memory.

One or more memories 1113 can be shared, distributed, and/or hybrid shared-distributed. Shared memory architectures can be based on global memory space, which can allow all nodes to share memory. In distributed memory architectures, on the other hand, processors have their own memory, and/or communication network and protocol to connect each computation node. Hybrid shared-distributed memory can include both shared and distributed memory architectures.

In particular embodiments, computer system 1110 can also include storage 1114 can includes mass storage for data or instructions. As an example, and not by way of limitation, storage 1114 can include a hard disk drive (HDD), a floppy disk drive, flash memory, an optical disc, a magneto-optical disc, magnetic tape, or a Universal Serial Bus (USB) drive or a combination of two or more of these. Storage 1114 can include removable or non-removable (or fixed) media, where appropriate. Storage 1114 can be internal or external to computer system 1110, where appropriate. In particular embodiments, storage can be non-volatile, solid-state memory. In particular embodiments, storage can include read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage taking any suitable physical form. Storage 1114 can include one or more storage control units facilitating communication between processor 1112 and storage 1114, where appropriate. Where appropriate, storage can include one or more storages. Although this disclosure describes and illustrates particular storage, this disclosure contemplates any suitable storage.

In particular embodiments, I/O interface 1115 includes hardware, software, or both, providing one or more interfaces for communication between computer system 1110 and one or more I/O devices. Computer system 1110 can include one or more of these I/O devices, where appropriate. One or more of these I/O devices can enable communication between a person and computer system 1110. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces 1115 for them. Where appropriate, I/O interface 1115 can include one or more device or software drivers enabling processor

1112 to drive one or more of these I/O devices. I/O interface 1115 can include one or more I/O interfaces 1115, where appropriate. Although this disclosure describes and illustrates a particular I/O interface, this disclosure contemplates any suitable I/O interface.

In particular embodiments, communication interface 1116 includes hardware, software, or both providing one or more interfaces for communication (such as, for example, packet-based communication) between computer system 1110 and one or more other computer systems 1110 or one or more networks. As an example and not by way of limitation, communication interface 1116 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1116 for it. As an example and not by way of limitation, computer system 1110 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 1110 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1110 can include any suitable communication interface 1116 for any of these networks, where appropriate. Communication interface 1116 can include one or more communication interfaces 1116, where appropriate. Although this disclosure describes and illustrates a particular communication interface, this disclosure contemplates any suitable communication interface. Communication interface can be used to receive and/or transmit related to one or more teeth of a pet.

In particular embodiments, bus 1111 includes hardware, software, or both coupling components of computer system 1110 to each other. As an example and not by way of limitation, bus 1111 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1111 can include one or more buses 8120, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

The above embodiments provide significant technical improvements and advantages. In particular, the features described above provide for the streamlining of data into a classified structure that allows for running multiple applications simultaneously, rather than separately running a single application for each database. For example, running multiple applications simultaneously can also be known as parallel processing of data intensive or computer intensive applications. Parallel processing can be classified as compute and/or data intensive. Data intensive applications face two major challenges, including processing exponentially growing data volumes and significantly reducing data analysis cycles with the aim of making timely decisions. On the other hand, compute intensive applications can be used to describe application programs that are compute bound. Such computer intensive applications can devote most of their execution time to computational requirements as opposed to input/output, and as such use small volumes of data. In certain non-limiting embodiments an application can be both data and compute intensive.

The classification between data and compute intensive parallel processing can also relate to grid computing. A computing grid can be heterogeneous in nature, meaning that the grid can use different computing nodes and/or multiple geographically distributed nodes using wide area networking communications. Grids can be used to solve complex computational problems that are compute intensive. On the other hand, data intensive computing systems can be homogeneous clusters, meaning that the nodes in the computing cluster can be identical and use local area communications between nodes. Grid computing can virtualize resources and provide the basis for cloud computing services. Cloud computing services can therefore be used for data-intensive parallel computing. In other words, certain non-limiting embodiments described above can utilize one or more cloud computer services. The one or more cloud computing services can include a large pool of configurable virtual resources that can be scaled to accommodate varying parallel processing loads. The varying processing loads can include big data.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments can include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments can provide none, some, or all of these advantages.

What is claimed is:

1. A method for meeting a healthcare need of a pet comprising:

collecting data from a plurality of disparate data sources associated with a plurality of platforms or devices, wherein the collected data comprise at least particular pet behavior specific to a species of the pet, and wherein the particular pet behavior indicates one or more symptoms associated with a health condition of the pet, and wherein the collected data from the disparate sources have different formats;

aggregating the collected data from the plurality of disparate data sources in a data lake, comprising resolving an identity of the pet by linking a plurality of identifiers associated with the pet from the plurality of disparate data sources and transforming the collected data with different formats into a cohesive format;

transmitting the aggregated data to a secured area isolated from external networks;

within the secured area:

clearing personal identification information from the aggregated data;

sorting the cleared data into one or more datasets based on one or more attributes of the pet or an owner of the pet; and generating, from the data included in the one or more datasets, hashed data associated with the pet and hashed data associated with the owner of the pet based on one or more hash algorithms;

creating a profile of the pet by matching the hashed data associated with the pet across the disparate data sources, wherein the profile of the pet comprises a healthcare need of the pet associated with the health condition of the pet;

executing a machine learning algorithm to process the profile of the pet and previous behaviors of the owner of the pet to determine a pet product to help fulfill the healthcare need of the pet associated with the health condition of the pet;

predicting, using the machine learning algorithm, a target audience comprising the owner of the pet for an advertisement of the pet product, wherein the predicting comprises an analysis of covariance, comprising:

evaluating whether a plurality of means of a dependent variable are equal across a plurality of levels of a categorical independent variable;

controlling for a plurality of effects from a plurality of other variable;

wherein the analysis of covariance is used in either a pre-test or post-test analysis;

using the plurality of identifiers, targeting, across the plurality of platforms or devices associated with the plurality of disparate data sources where the data is collected from the owner of the pet with the advertisement of the pet product, wherein the owner of the pet is targeted at least through a terminal device comprising one or more of a computer, a mobile device, or a pet tracking device;

determining a size of the advertisement based on a number of pixels on a display of the terminal device that the advertisement can occupy; and displaying the advertisement based on the determined size through the display of the terminal device.

2. The method according to claim 1, further comprising:
displaying the advertisement of the pet product to the owner of the pet through a graphical user interface rendered on the display of the terminal device.

3. The method according to claim 1, wherein the data comprises at least one of first-party data, second-party data, or third-party data.

4. The method according to claim 1, wherein the plurality of disparate data sources comprises a health and location tracking device, a DNA or genetic testing service, or a point of sale device at a veterinary hospital.

5. The method according to claim 1, wherein the collected data comprises pet health information.

6. The method according to claim 1, wherein the aggregating and transforming, clearing, sorting, generating, creating, and determining are performed by a consumer data platform or a data management platform.

7. The method according to claim 1, further comprising:
reformatting the data from the plurality of disparate data sources to a uniform level of quality.

8. The method according to claim 1, wherein the target audience can include one or more other pet owners.

9. The method according to claim 1, wherein the one or more datasets comprises at least one of pet health, pet ownership, physical or behavior traits of the pet.

10. The method according to claim 1, wherein the plurality of disparate data sources is first party data collected from a health and location tracking device.

11. The method according to claim 1, wherein the plurality of disparate data sources are a plurality of genetic testing services.

12. The method according to claim 11, wherein the data lake includes a data consent framework.

13. The method according to claim 12, wherein the data consent framework comprises a transparency and consent string.

14. A system for meeting a healthcare need of a pet comprising:
at least one processor; and
at least one memory comprising computer program code;
wherein the computer program code is configured, when executed by the at least one processor, to cause the system to:
collect data from a plurality of disparate data sources associated with a plurality of platforms or devices, wherein the collected data comprise at least particular pet behavior specific to a species of the pet, and wherein the particular pet behavior indicates one or more symptoms associated with a health condition of the pet, and wherein the collected data from the disparate sources have different formats;
aggregate the collected data from the plurality of disparate data sources in a data lake, comprising resolving an identity of the pet by linking a plurality of identifiers associated with the pet from the plurality of disparate data sources and transforming the collected data with different formats into a cohesive format;
transmit the aggregated data to a secured area isolated from external networks;
within the secured area:
clear personal identification information from the aggregated data;
sort the cleared data into one or more datasets based on one or more attributes of the pet or an owner of the pet; and generate, from the data included in the one or more datasets, hashed data associated with the pet and hashed data associated with the owner of the pet based on one or more hash algorithms;
create a profile of the pet by matching the hashed data associated with the pet across the disparate data sources, wherein the profile of the pet comprises a healthcare need of the pet associated with the health condition of the pet;
execute a machine learning algorithm to process the profile of the pet and previous behaviors of the owner of the pet to determine a pet product to help fulfill the healthcare need of the pet associated with the health condition of the pet;
predict, using the machine learning algorithm, a target audience comprising the owner of the pet for an advertisement of the pet product, wherein the predict comprises an analysis of covariance, comprising:
evaluate whether a plurality of means of a dependent variable are equal across a plurality of levels of a categorical independent variable;
control for a plurality of effects from a plurality of other variable;
wherein the analysis of covariance is used in either a pre-test or post-test analysis;
using the plurality of identifiers, target, across the plurality of platforms or devices associated with the plurality of disparate data sources where the data is collected from the owner of the pet with the advertisement of the pet product, wherein the owner of the pet is targeted at least through a terminal device comprising one or more of a computer, a mobile device, or a pet tracking device;
determine a size of the advertisement based on a number of pixels on a display of the terminal device that the advertisement can occupy; and
display the advertisement based on the determined size through the display of the terminal device.

15. The system according to claim 14, wherein the computer program code is configured, when executed by the at least one processor, to cause the system to:
display the advertisement of the pet product to the owner of the pet through a graphical user interface rendered on the display of the terminal device.

16. The system according to claim 14, wherein the data comprises at least one of first-party data, second-party data, or third-party data.

17. The system according to claim 14, wherein the plurality of disparate data sources comprises a health and location tracking device, a DNA or genetic testing service, or a point of sale device at a veterinary hospital.

18. The system according to claim 14, wherein the collected data comprises pet health information.

19. The system according to claim 14, wherein the aggregating and transforming, clearing, sorting, generating, creating, and determining are performed by a consumer data platform or a data management platform.

20. The system according to claim 14, wherein the computer program code is configured, when executed by the at least one processor, to cause the system to:
reformat the data from the plurality of disparate data sources to a uniform level of quality.

21. The system according to claim 14, wherein the target audience can include one or more other pet owners.

22. The system according to claim 14, wherein the one or more datasets comprises at least one of pet health, pet ownership, physical or behavior traits of the pet.

23. The system according to claim 14, wherein the plurality of disparate data sources is first party data collected from a health and location tracking device.

24. The system according to claim 14, wherein the plurality of disparate data sources are one or more genetic testing services.

25. The system according to claim 14, wherein the data lake includes a data consent framework.

26. The system according to claim 25, wherein the data consent framework comprises a transparency and consent string.

\* \* \* \* \*